United States Patent [19]

Vaughn et al.

[11] Patent Number: 5,475,800
[45] Date of Patent: Dec. 12, 1995

[54] COLOR SEPARATION IN COLOR GRAPHICS PRINTING WITH LIMITED MEMORY

[75] Inventors: Ronald J. Vaughn, Fort Collins, Colo.; John R. Matthews, Vancouver, Wash.

[73] Assignee: Hewlett-Packard Company, Palo Alto, Calif.

[21] Appl. No.: 954,787

[22] Filed: Sep. 30, 1992

Related U.S. Application Data

[63] Continuation-in-part of Ser. No. 784,498, Oct. 29, 1991, Pat. No. 5,168,552.

[51] Int. Cl.$^6$ .................................. B41J 2/21; H04N 1/46
[52] U.S. Cl. ........................... 395/109; 395/131; 358/518
[58] Field of Search ..................................... 395/101, 106, 395/109, 114, 131; 358/298, 504, 505, 515–520

[56] References Cited

U.S. PATENT DOCUMENTS

| | | | |
|---|---|---|---|
| 4,682,216 | 7/1987 | Sasaki et al. | 358/79 |
| 4,896,275 | 1/1990 | Jackson | 395/115 |
| 4,908,712 | 3/1990 | Uchiyama et al. | 358/298 |
| 5,012,257 | 4/1991 | Lowe et al. | 395/109 |
| 5,283,671 | 2/1994 | Stewart et al. | 358/532 |
| 5,331,438 | 7/1994 | Harrington | 358/516 |
| 5,428,377 | 6/1995 | Stoffel et al. | 358/518 |

FOREIGN PATENT DOCUMENTS

| | | |
|---|---|---|
| 0295105 | 12/1988 | European Pat. Off. |
| 323265 | 7/1989 | European Pat. Off. |
| 0540173 | 5/1993 | European Pat. Off. |

*Primary Examiner*—Raymond J. Bayerl
*Assistant Examiner*—Tracy M. Legree

[57] ABSTRACT

In liquid-ink color graphics printing, true black ink is preferred over composite black wherever possible, but poor print quality results from printing black ink too close to color ink, due to limitations in present ink chemistry. A method of processing color bit-map graphics data in a four-color liquid-ink printing system, so as to maximize use of black ink while maintaining a minimum spacing between black and color inks is disclosed. The input data is stored in CMY bit-map color planes. Preliminarily, data representing composite black is moved from the color planes into a K plane for printing by a true black pen. The data is examined to detect any black ink within the minimum spacing from color ink. The examination is expedited by partitioning the data into blocks, and indicating each block as a color block, a black block, or a white block. These indications are conveniently stored in a color table and a black table, in which each block of data is represented by a single bit. Tests for black adjacent color are conducted at the block level, i.e. in the tables, rather than at the individual bit level. Where a black block is detected adjacent a color block, the spacing violation is corrected by moving the corresponding block of data from the K plane back into the color planes for printing as composite black. After such correction, the data is re-checked to detect any new violation(s) resulting from the correction. The process repeated until no minimum spacing violations are found.

12 Claims, 26 Drawing Sheets

Valid Configuration

Valid Configuration

Valid Configuration

Invalid Configuration

Invalid Configuration

|   | 1 | 2 | 3 | 4 | 5 | 6 | 7 | 8 |
|---|---|---|---|---|---|---|---|---|
| 1 | 00000000<br>00000000<br>00011111<br>00011111<br>00011111<br>00000000<br>00000000<br>00000000 | 00000000<br>00000000<br>11100000<br>11100000<br>11100000<br>11100000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000111<br>00000111 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 |
| 2 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 11000000<br>11000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 |
| 3 | 00000000<br>00000000<br>00000000<br>00000000<br>00000000<br>00000000<br>00000000<br>00000000 | 00000000<br>00001000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00001111<br>00000000<br>00000000<br>00000000<br>00000000<br>00000000<br>00000000 | 00000110<br>00000110<br>00000110<br>00000000<br>00000000<br>00000000<br>00000000<br>00000000 | 00000000<br>00000000<br>00000000<br>00000000<br>00000000<br>00000000<br>00000000<br>00000000 |

|   | 1 | 2 | 3 | 4 | 5 | 6 | 7 | 8 |
|---|---|---|---|---|---|---|---|---|
| 1 | 00000000<br>00000000<br>00000000<br>00000000<br>00000000<br>00000000<br>00000000<br>00000000 | 00000000<br>00000000<br>00001111<br>00000000<br>00000000<br>00000000<br>00000000<br>00000000 | 00000000<br>00000000<br>11111111<br>00000000<br>00000000<br>00000000<br>00000000<br>00000000 | 00000000<br>00000000<br>11110000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 |
| 2 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000011<br>00000011 | 00000000<br>00000000<br>00000000<br>00000000<br>00000000<br>00000000<br>11100000<br>11100000 |
| 3 | 00000000<br>00000000<br>00000000<br>00000000<br>00000000<br>00000000<br>00000000<br>00000000 | 00000000<br>00111000<br>00111100<br>00111100<br>00000000<br>00001100<br>00111100<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000000<br>00000000<br>00000000<br>00000000<br>00000000<br>00000000<br>00000000<br>00000000 | 00000011<br>00000011<br>00000000<br>00000000<br>00000000<br>00000000<br>00000000<br>00000000 | 11100000<br>11100000<br>00000000<br>00000000<br>00000000<br>00000000<br>00000000<br>00000000 |

```
00000000 00000000 00000000
00000000 10000000 00000000
00000000 00000000 00000000
```
FIG. 14A
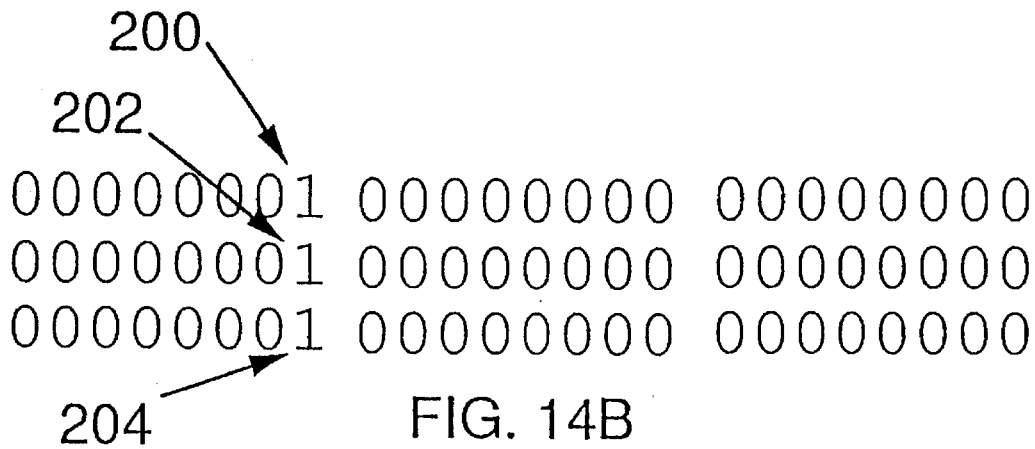
FIG. 14B
```
00000000 00000000 00000000
00000000 00000001 00000000
00000000 00000000 00000000
```
FIG. 14C
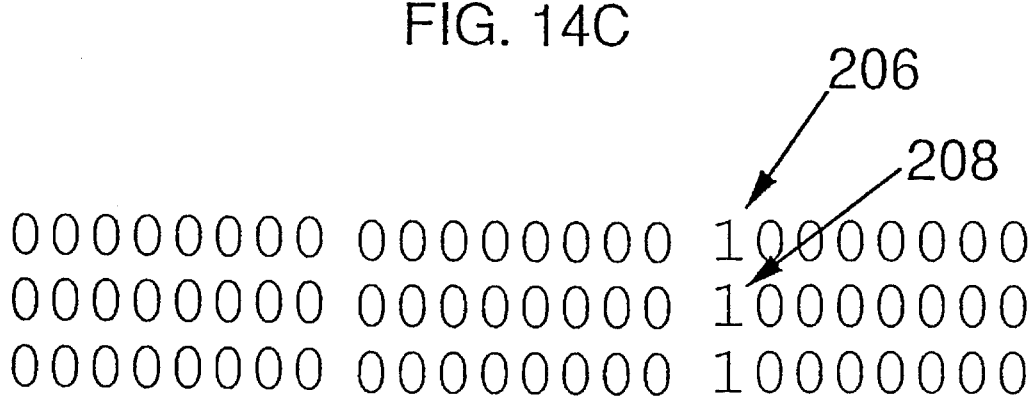
FIG. 14D

| Black table | Color table | Image |
|---|---|---|
| 00000000 | 00000000 |  |
| 00000000 | 00000000 | |
| 00010000 | 00000000 | |
| 00010000 | 00000000 | |
| 00010000 | 00000000 | |
| 00010000 | 00000000 | |
| 00010000 | 00000000 | |
| 00010000 | 00000000 | |
| 00010000 | 00000000 | |
| 00010000 | 00000000 | |
| 00010000 | 00000000 | |
| 00010000 | 00000000 | |
| 00000000 | 00010000 | |
| 00000000 | 00000000 | |
| 00000000 | 00000000 | |
| 00000000 | 00000000 | |
| 00000000 | 00000000 | |

```
00000000     00000000
00000000     00000000
00010000     00000000
00010000     00000000
00010000     00000000
00010000     00000000
00000000     00010000
00000000     00010000
00000000     00010000
00000000     00010000
00000000     00010000
00000000     00010000
00000000     00000000
00000000     00000000
00000000     00000000
00000000     00000000
```

Black table     Color table     Image

```
00000000     00000000
00000000     00000000
00000000     00010000
00000000     00010000
00000000     00010000
00000000     00010000
00000000     00010000
00000000     00010000
00000000     00010000
00000000     00010000
00000000     00010000
00000000     00010000
00000000     00000000
00000000     00000000
00000000     00000000
00000000     00000000
```

Black table     Color table      Image

COLOR SEPARATION IN COLOR GRAPHICS PRINTING WITH LIMITED MEMORY

RELATED APPLICATION DATA

This application is a continuation-in-part of application Ser. No. 07/784,498 filed Oct. 29, 1991, now U.S. Pat. No. 5,168,552. The parent case discloses color separation techniques for graphics printing. This application includes the prior disclosure, and additional disclosure for color separation in applications where limited memory space prevents examination of an entire graphics image at one time.

BACKGROUND OF THE INVENTION

This invention relates to the field of liquid ink printing systems, for example ink jet printing systems, and, more particularly, to methods for improving resolution and print quality in four-color ink jet printing systems.

Known ink jet color printing systems use a three-color, for example, Cyan, Magenta and Yellow ("CMY") print head or "pen". All three colors are combined to form composite black (also called "process black") when black is needed. It is preferable, however, to print with (true) black rather than composite black for the following reasons:

1. Black looks better than composite black. Because composite black is composed of three colors, it often has a colored tint to it. It might appear, for example, as green-black, or blue-black. Also, the print quality of composite black varies with paper type, temperature and humidity.

2. In a typical computer system, print data is sent from the host computer to the printer to control the printing of each of the four colors, CMYK, where K represents black (to avoid confusion with the color blue). If an area on a page is printed with composite black, information must be sent to the printer for the CMY inks. If the same area is printed with a black pen (true black), only data for the K ink must be sent. So use of the black pen represents a potential three-to-one reduction in data transmission between the host and the printer.

3. Printing composite black requires the deposition of three times as much ink volume on the print media as is required for printing true black. This is not only more expensive to operate, but can also cause the media, especially plain paper, to develop a curl or develop other irregular perturbations in the area where the large volume of ink is deposited.

4. When printing composite black, the color pen must make three passes over the same region, the first pass putting down cyan ink, the second magenta and lastly yellow. If the same region is printed with the black pen, the black pen needs to make only one pass over the region to put down black ink. This represents a significant improvement in printing speed.

Some ink jet printers employ both a color pen and a black pen, but not for use at the same time. In other words, only one or the other pen may be used in the printer at one time. Commercial examples are the Hewlett-Packard DeskWriter C™ and DeskJet 500 C™. Because only one pen can be used at a time, a page is either color or black, but not a mix of color and black on the same page. The user must manually swap pens before a page prints if the wrong pen is in the printer. When the color pen is in use, areas that should be black are printed using composite black. This compromises print quality and printing speed, for the reasons stated above.

Four-color printers are those having the three primary colors plus black (CMYK) available for use within a single page. Known four-color (CMYK) ink jet printers, however, have limited resolution and must print on special glossy paper. For example, the Hewlett-Packard PaintJet XL™ contains four print heads, one each for CMY and K. While that printer does not have to use composite black, its resolution is only 180 dots per inch (DPI). The Kodak DACONIX Color 4 Printer also contains four print heads for CMYK, only at 192 DPI. The Sharp JX-730 Color Ink Jet Printer is another four color printer that is 216 DPI. Both the Kodak and Sharp printers can print black adjacent to color, but again, at much lower resolution and only on special paper.

What is needed is a liquid ink printing system that allows mixing true black and color inks within a printed page and provides for high resolution printing on regular non-glossy paper. New inks are being developed for printing at high resolution, for example 300 DPI (dots per inch) on plain paper, i.e. a non-glossy paper such as bond paper used in a typewriter. Due to ink chemistry limitations, however, the color and black inks cannot touch on the page, and in fact cannot come within a minimum distance of each other on the page. When the inks do come within the minimum distance, the color ink draws the dye out of the black ink, causing the black ink to lighten. This lightening of the black ink on the page yields unacceptable print quality, and must be avoided. Accordingly, a need remains for maintaining a predetermined minimum spacing between black and color inks on a printed page.

One approach to maintaining a minimum spacing ("delta") required between color and black inks would be to examine each color dot on the page and then see if any of the surrounding dots within delta are black, and if they are, convert them to composite black. Such a method is not practical using present technology, for the following reasons. There are approximately eight million dots on an 8.5" by 11" page. For each dot, there are 138 surrounding dots within the minimum spacing—delta (see FIG. 1), each of which must be examined. Also, once a dot is converted from black to composite black, it is made of CMY (color) inks. Therefore, the algorithm must examine this new composite black dot's surrounding 138 dots to see if any are made of K ink. These procedures would easily require checking hundreds of millions or even billions of dots per page. The processing time would be excessive and, therefore, such an approach is not practical.

The processing problem is further complicated when the entire image is not available for evaluation at one time, such as when the image is generated in a piece-meal fashion. Generating the image piece-meal is commonly done in computers with a limited amount of memory to generate the image. By generating only a portion of the image at one time, known as banding, the computer needs only enough memory to manipulate one portion of image being generated, each of the portions being known as a band. After the computer has imaged a single band, it sends the band to the printer before beginning to form the next band of the image. In this way, the entire image can be generated in an amount of memory substantially less than required to generate the entire image at once, approximately 1/N the amount of memory, where N is equal to the number of bands used.

In many computer operating environments, e.g., Microsoft Windows, even if there exists sufficient memory in the computer to image the entire page, only a limited amount of memory is made available to image the page. In addition, the amount of memory available fluctuates, depending on the number of other programs currently consuming memory. By generating the image in bands, the banding process is able to dynamically adjust the size of the bands to match the amount of memory available in the computer.

The complication for the color separation process arises at the boundaries between adjacent bands. Because only a single band is imaged at a time, the banding process does not know the color properties of the pixels in an adjacent band. For example, if, in the current band, a vertical black line terminates on a band boundary, there is no information within the current band to determine whether there is color in the adjacent band within the minimum spacing of the black line. As a result, it cannot be determined whether to print the line in true black or composite black without some knowledge of future bands.

SUMMARY OF THE INVENTION

An object of the present invention, therefore, is to allow mixing color and true black printing within a single printed page at high resolution.

Another object is to increase resolution in four-color liquid ink printing on plain non-glossy paper.

Yet another object is to maximize use of true black ink rather than composite black ink in a four-color (CMYK) printing system, while maintaining a predetermined minimum spacing between true black ink and color ink to preserve print quality.

Another object is to maintain a predetermined minimum spacing between true black ink and color ink across band boundaries in printing systems that employ banding.

A further object is to compensate for pen misalignment in a two-pen four-color printing system.

Another object is to speed processing of bit-map color plane data to improve printing speed in a color printing system.

Another object is to design and implement a very high speed strategy for modifying bit-map color plane data so as to maximize use of true black ink while maintaining a minimum spacing between black ink and color ink, all without unduly slowing the printing process.

Yet another object of the invention is to allow users to mix color and black on the same printed page. For example, to allow users to print a business letter with a color bar-chart in the middle of a page of text. The black will be from the black pen; the colors from the color pen.

The new method initially separates data that represents black from data that represents color. Data that represents black is moved into a "K plane" from the CMY planes. In a four-color ink jet printer, the CMY planes control their respective colors in the color pen, and the K plane controls the K pen.

In general, for each band the present method calls for first identifying color graphics data in the color (CMY) planes that represents composite black (i.e. the corresponding bits are turned on in all three CMY planes), and replacing that data with data in the K plane. This is done in a manner that maintains a predetermined minimum spacing—delta—between K plane bits and color plane bits. Initially, composite black data is moved from the CMY planes to the K plane, thus changing it from representing composite black to representing (true) black. But this cannot be done blindly, as the new K plane data in some cases would violate the minimum spacing restriction. In such cases, composite black must be used. So the method next detects and corrects minimum spacing violations. The next step is to re-check the data to detect new spacing violations resulting from the corrections, etc. This re-checking may be implemented recursively, though it need not necessarily be done in that manner. Additional details for carrying out these methods at high speed, to maximize printing throughput, are disclosed.

In the case of banded images, the process is complicated because not all the image information is readily available. Therefore, for each band, if the current band is not the terminal band on the page, the black data along the bottom row of the band must be placed initially in an indeterminant state, known as a question mark. A question mark bit indicates black, but whether it will ultimately print as true black or composite black cannot yet be determined. The question mark can not be resolved until at least the top row of the next band has been examined. Furthermore, since the question mark may eventually turn out to be color (composite black is color), all of the black data within the minimum spacing of the question mark data must be redesignated as question mark data as well. This process of propagating question marks is analogous to that of propagating color, described above.

One of the challenges in performing the needed color separation is to overcome the overwhelming number of bits in the bit planes that must be examined. This invention first compresses the data into eight dot by eight dot blocks of data. Each of these blocks is on a byte boundary, allowing the algorithm to look at eight dots at a time using single machine instructions. Furthermore, each 8×8 block is represented in either a color table or a black table by just one bit, or a bit in both tables to represent a question mark block. Byte operations on the color or black tables thus take into account 512 dots on the page in one machine instruction (each of the eight bits in a byte from the table represents 64 dots from the original 8×8 block. 64×8=512).

Compressing the original CMY planes (which are approximately 1 Megabyte each) into the color and black tables (which are 16 Kilobytes each) allows the color separation technique to quickly determine where K ink is next to CMY ink. When a color block is adjacent to a black block, the data in the black block is moved from the K plane back to the CMY planes. The process is complete when there are no black blocks adjacent to color blocks and there are no remaining question mark blocks.

The method proceeds with examining the true black data and the color data, to detect data representing black dots within a predetermined minimum spacing from color dots. If such data is detected, it is corrected by re-designating the offending black data as composite black data for printing in color ink. This new color data may be too close to black data, however. So the method further calls for repeating the examining and re-designating steps until no black dots are detected within the minimum spacing from color dots. Similarly, question mark data is converted to color data since any dots within a predetermined minimum spacing of color must be printed with color.

A similar sequence of steps are applied to the question mark data. If black data is within the minimum spacing from question mark data, the black data is redesignated as question mark data. If after the question mark data has been examined there are no such data, the processing of the band is complete and the band can be sent to the printer for printing. Printing the data includes printing the true black data using black ink, and printing the color data, including the composite black bits, using color ink, thereby maintaining at least the minimum spacing between black dots and color dots on the printed page.

In the event that there are unresolved question marks, the indeterminate band is temporarily stored, i.e., spooled, to a secondary storage device (such as a disk drive) awaiting additional information. Prior to storing the band, the question mark bits are converted to black bits, since there is a high probability that the question mark bits will ultimately turn out to be black. If, however, that assumption turns out to be false, and any of the question mark bits resolve to color bits, the spooled band must be abandoned and the band reimaged. In addition, before spooling the band to the secondary storage device, any additional processing normally done on the band, e.g., compression, color matching, ink depletion, or edge enhancement, is completed.

Next, the secondary storage is examined for any pending spooled bands, which may have been resolved based on the processing of the current band. If there are any pending bands and there are remaining question marks, no more pending bands are examined since additional information is still required and therefore the next band is requested. If new color has propagated up into one of the pending bands, i.e., we assumed incorrectly that the question marks would be resolved to black, the pending band must be discarded and the band reimaged. If, however, the assumption is correct and the question marks were resolved as black, the pending band is forwarded on to the printer for printing in the manner described above. This process is repeated until all of the pending bands have been examined.

In greater detail, the step of examining the data is done expeditiously by first selecting a block size equal to at least the minimum spacing in both vertical and horizontal dimensions. Next is partitioning the input data to define a series of blocks of the selected block size. Each one of the series of blocks is designated as color, black or white. Having done so, we examine the block designations to detect black blocks adjacent color blocks. Where this occurs, the detected black blocks are re-designated as color blocks. These steps are repeated until no black blocks are detected adjacent color blocks, thereby ensuring at least the minimum spacing between color data and black data. Thereafter, printing the black blocks using black ink and printing the color blocks using color inks completes the printing process. The processed data can of course be stored to a file or otherwise transferred, for example, for deferred or remote printing operations.

The designations of each block as color, white or black, or question mark appear in a color table, a black table, or both, respectively. The black table has a series of bits, each black table bit corresponding to a respective one of the K plane blocks, and indicating by its binary state whether or not the corresponding K plane block is a black block. Similarly, the color table has a series of bits, each color table bit corresponding to a respective one of the color plane blocks and indicating whether or not the corresponding color plane block is a color block. For a question mark, the corresponding bits in both the color and black tables are used since the two tables are mutually exclusive otherwise. These steps provide for examining the data implicitly at a high speed by examining the color table and black table entries.

For each on bit in the color table, representing a color block, the method calls for examining adjacent bits in the black table as follows. First, testing a corresponding black table byte to detect an indication of a black block to the left or right of the color table bit, thereby indirectly detecting a black block adjacent the color block. The method further includes testing black table bytes directly above and below the corresponding black table byte detect any adjacent on bits indicating adjacent black blocks. Diagonally adjacent locations in the black table are tested as well. The process is similarly applied to question mark blocks adjacent to color blocks, with the resulting question mark blocks being converted to color blocks. Similarly, black blocks adjacent to question mark blocks can be easily ascertained.

The invention thus includes methods of processing graphics input data for output at high resolution with adequate color separation. The resulting output data may be used to drive a CRT or other color display device, or to control a liquid-ink printer as is illustrated in the preferred embodiment. The new methodology is useful in any output or rendering application in which separation of one "color" or ink (black in the example) from other colors by at least a minimum spacing is desired.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 7A illustrates a portion of a combined color (CMY) plane which is partitioned to form three rows by eight columns of blocks, each block consisting of eight bytes of data.

FIG. 7B illustrates a portion of a color table in which each bit corresponds to a respective one of the data blocks of FIG. 8A and indicates whether or not the corresponding block has any color bits ON.

FIG. 8A illustrates a K (black) plane which is partitioned to form three rows by eight columns of blocks in the same manner as the color plane of FIG. 8A.

FIG. 8B illustrates a portion of a black table in which each bit corresponds to a respective one of the data blocks of FIG. 9A and indicates whether or not the corresponding block has any K bits ON.

FIG. 12A illustrates a portion of a color table in which one bit is ON.

FIG. 12B identifies the pertinent bits surrounding the ON bit of FIG. 12A in the corresponding black table.

FIG. 13A is a portion of a color table with two bits ON.

FIG. 13B is the color table of FIG. 13A with same-row neighbor bits turned ON (a "mask").

FIG. 13C is a portion of a black table corresponding to FIGS. 13A and 13B.

FIG. 13D shows the resulting mask after logically ANDing the black table of FIG. 13C the mask of FIG. 13B.

FIG. 14A shows a portion of a color table in which the leftmost bit of one byte is ON.

FIG. 14B is a portion of a black table corresponding to the color table of FIG. 14A and indicating by 1's three bits adjacent the ON bit of FIG. 14A.

FIG. 14C is a portion of a color table in which the rightmost bit of a selected byte is ON.

FIG. 14D is a portion of a black table corresponding to the color table of FIG 14C and indicating by 1's the bits adjacent the ON bit of FIG. 14C.

DETAILED DESCRIPTION OF THE PREFERRED EMBODIMENT

A. Introduction and Nomenclature

Figure 1:
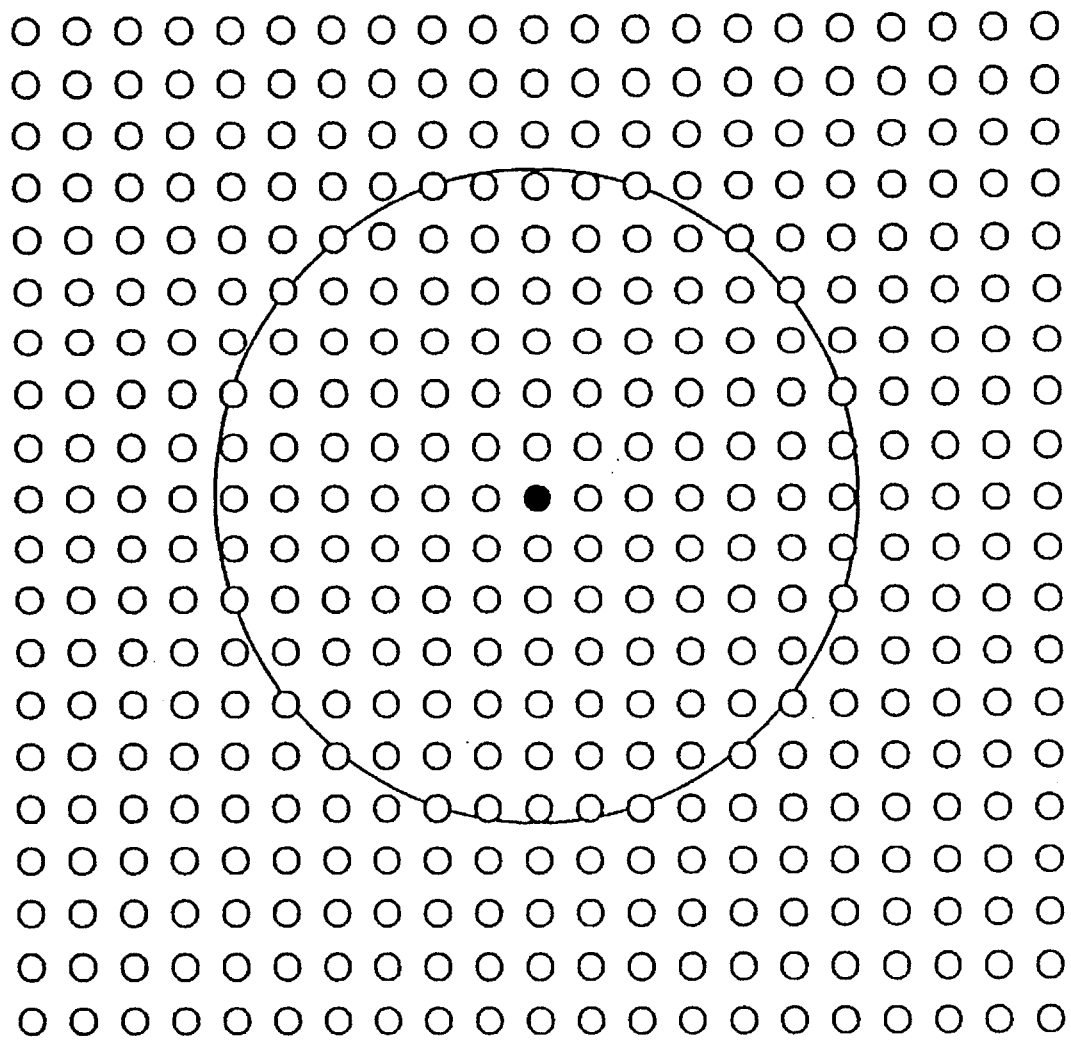
FIG. 1 is an illustration of an array of ink dot locations on a substrate showing a six-dot spacing around a selected dot location.

The colors Cyan, Magenta and Yellow are referred to as CMY. Black is referred to as K (K instead of B, so as to not confuse this color with Blue). In an example of a printer useful in connection with the present invention, two pens are provided—one containing the color inks CMY and the other containing black ink. These are called the color pen and the black pen, respectively. Black printed on the page using the color pen (i.e. a combination of CMY) is called composite black or process black. Hereafter, black printed on the page using the black pen will simply be called black.

A dot (also called a pixel) is the smallest single area on the page that a pen can place ink. For example, a commercial embodiment of the invention provides for printing at a resolution of 300 Dots Per Inch (DPI) both vertically and horizontally.

The input data to a printing system, or print data, indicates where to place ink on the printed page in the form of bit-map planes. A plane conceptually is a two-dimensional array of bits corresponding to a particular a page to be printed. Each plane contains the data for one color. There may be three color planes, for example CMY, as noted above. Any desired color may be obtained by combinations of these colors. Other systems may use RGB (red-green-blue) color planes, as is common in video display systems.

Each bit in a plane represents one dot location on the page. If the bit is on (value 1 ), the ink for that color plane for that dot is printed. If the bit is off (value 0) nothing is printed for that color plane for that dot. Since all three color planes are frequently considered together in this specification, we shall refer to "a bit in the color planes" to mean the corresponding bits (i.e. those having the same row/col location) in all three color planes. Similarly, we will refer to a "block of data in the color planes" to mean the corresponding blocks of data in all three color planes. In some systems, input data may comprise four planes, one each for the colors CMY and one for black (K). Alternatively, the K plane may be derived from the CMY color planes as explained below.

An image can be comprised of distinct segments or bands of the image. The image is typically broken into bands when there are memory constraints within the computer or the printer which prohibit the entire image from being resident in memory at one time.

B. Restrictions on Ink Dot Positioning

The CMY inks and K ink are mutually exclusive, i.e. a dot can have either some combination of CMY inks, or K ink, or no ink, but can never have a combination of CMY inks and K ink. Accordingly, a dot can have one and only one of the following printed on it:

1. Nothing. The dot is white or empty.

2. A combination of ink from the color pen, i.e. CM or Y but not all three. This is a color dot.

3. A combination of all three inks from the color pen, CM and Y. This is a composite black dot.

4. Ink from the black pen. This is a black dot.

C. Minimum Spacing

There is a further restriction on where the CMY and K inks can be placed on the page. Along with not being able to be on the same dot, the CMY and K inks cannot be within a predetermined minimum distance of each other. This minimum spacing requirement varies with the print environment (e.g. paper quality, temperature, humidity etc.). A useful minimum distance is two to three dots. However, the problem of how close the CMY inks can be to the K ink is complicated by the fact that, when two pens are positioned in an actual printer, they can be mis-aligned. This misalignment can extend to a distance equivalent to two to three dots. Consequently, in the preferred embodiment, the minimum separation between CMY and K (black) inks is 6 dots (or pixels). In general, the minimum spacing is referred to as delta. The actual number of dots depends upon the application.

The distance 6 dots is a linear distance, for example 1/50th of an inch (at 300 DPI), which is also used for diagonal measures. FIG. 1 illustrates an array of dot locations on a generally planar substrate such as a sheet of paper. Each dot location is represented by a small open circle, except for one dot location at which the circle is solid black. A circle about the solid black dot location illustrates a radius of six dots. For example, if the dot array represented were 300 DPI, the radius of the circle is approximately 1/50th of one inch.

If the solid black dot location represents a dot of black ink, then the circle indicates which of the surrounding dots cannot be color or composite black. Thus, any dot location that is on or within the circle cannot be printed by the color pen. Conversely, if the dot in the center of the circle represents color or composite black, then no dot that is on or within the circle should be printed with the black pen.

Figure 2:
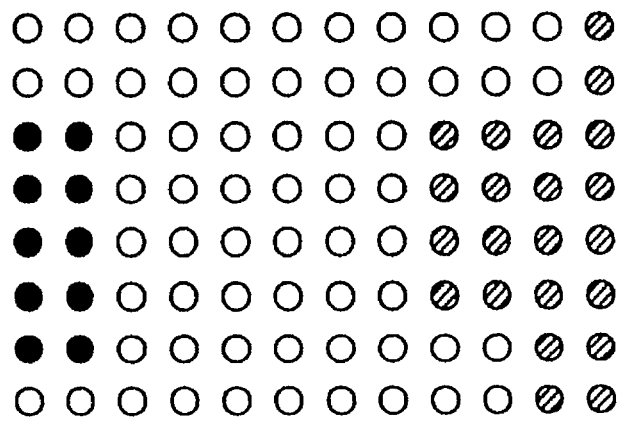
FIGS. 2–4 illustrate examples of valid configurations of ink drops applied to a substrate in which a predetermined minimum distance (six dots) is maintained between each black dot and each color or composite black dot.
Figure 3:
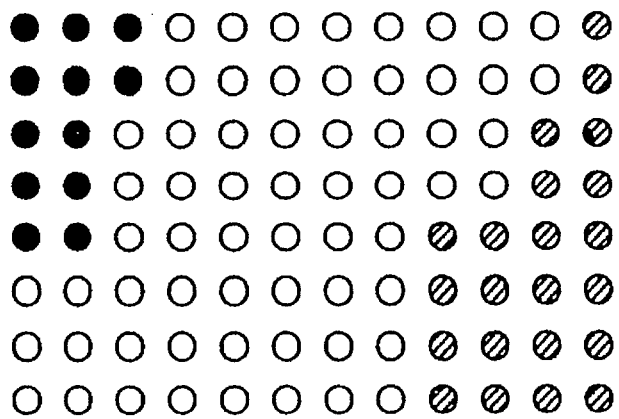
Figure 4:
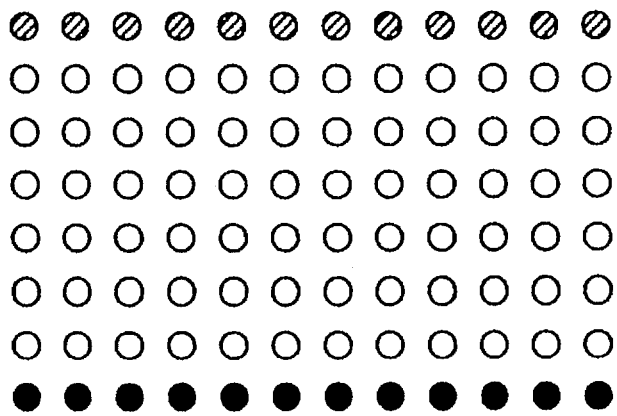
Figure 5:
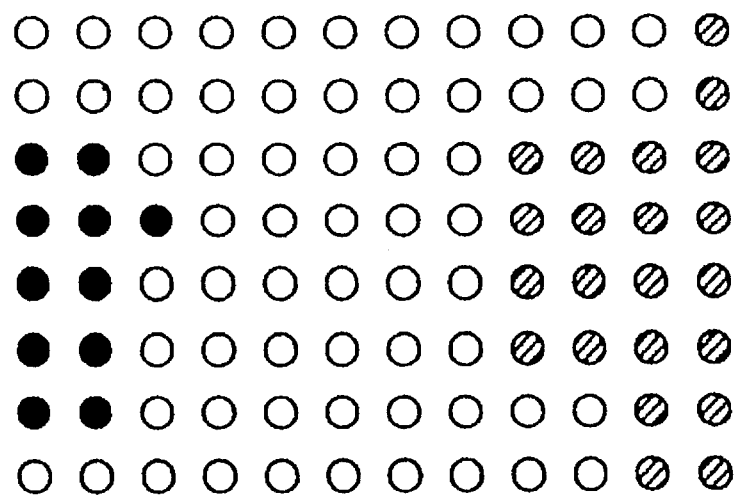
FIG. 5–6 illustrate examples of invalid configurations of ink dots applied to a substrate in that, in each example, at least one color or composite black dot is located less than the minimum spacing from a black dot.
Figure 6:
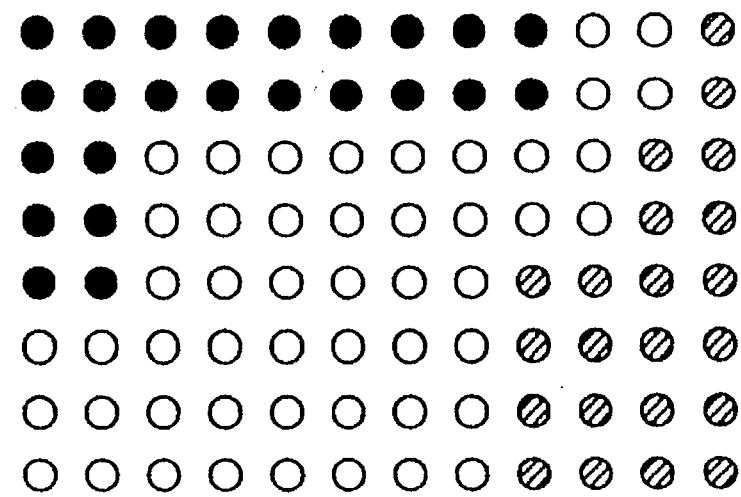

A valid configuration of dots on a page is one that has no CMY ink within delta dots of K ink. FIGS. 2 through 4 give examples of valid configurations of ink drops on a page. In these figures, solid black circles represent a black dot(K ink); shaded or hatched circles represent color or composite black dots (CMY ink); and open circles represent white dots (no ink). FIGS. 5 and 6 illustrate invalid configurations. In each of these figures, at least one CMY ink dot is within delta (here six dots) of a black dot. Where the input data to a printing system represents ink drop configurations that are invalid, i.e. that violate any of above restrictions, the data must be modified before printing in order to maintain print quality.

Since the bit plane data represent the inks that are printed on the page, the restrictions described above concerning overlapping and minimum spacing between color and black inks may conveniently be implemented by applying to the restrictions to corresponding data in the bit planes. There can, for example, be a bit turned on in the C and M planes for the same dot. There can never be a bit turned on (or left on at print time) in the K plane and any of the CM or Y planes for the corresponding dot, since this would violate the restriction that the CMY and K inks must be mutually exclusive. If the same bit is on in all three CMY planes, this represents a composite black dot. If no bit is on in any plane for a dot, this is an empty dot (white space). Lastly, to implement the minimum spacing restriction, if there is a bit turned on in the K plane, there cannot be a bit turned on in the CM or Y planes within six dots of the corresponding bit location.

D. Data Structures

The method is preferably implemented in software, though special hardware or a combination of the two may be used. Suitable code may be executed to process the print data in any convenient location. For example, it may be implemented in a "printer driver" program in a computer or in software in the printer itself. In the preferred embodiment, three major data structures are defined: the K plane, the color table and the black table. These will now be discussed in detail.

1. The K plane

The K plane, as noted before, represents where to use the black pen on the page. Each bit in the K plane represents one dot on the printed page. The K plane thus has the same dimensions as the color planes. If a bit is on in the K plane, none of the corresponding bits in the CMY planes can be on, nor can any of the CMY plane bits be on within delta of the K plane bit. The K plane is represented by reference number 60 in the diagram of FIG. 10. Where banding is used, both the K plane and the CMY planes have dimensions equal to the band size.

2. The Color Table

The color table is a compressed representation of the CMY planes. It is important to understand the relationship between the color table and the CMY planes. Each bit in the color table represents a predetermined subset of the CMY planes. In particular, each table bit represents a contiguous, rectangular array of bits in the CMY planes called a block. To illustrate the concept, if the color planes had dimensions 50 by 100 bits, they could be divided into, for example, four equal, contiguous, rectangular arrays (blocks) of 25 by 50 bits each. In other words, each block would be a quadrant of the color planes. If each such block is represented by one bit in a color table, the color table would be two by two bits. It may be said that the color data is compressed in this illustration by a factor of 1250 (i.e. 25 by 50 bits into one bit). (There is an additional factor of three, in that three color planes (CMY) are compressed into one, for a total "compression" of 3750:1)

It is advantageous for fastest processing, however, to "compress" the color plane data in a manner based on the hardware byte size. In other words, to define a block size for a particular application so as to minimize machine instruction cycles, as is familiar to those skilled in computer science. Since many processors use an 8-bit byte, each bit in the color table in a preferred embodiment represents one 8-bit by 8-bit array in the CMY planes. Ergo, the size of a block in the preferred embodiment is 8-bits by 8-bits. The individual color planes are represented by reference numbers 54, 56 and 58 in FIG. 10. The color table is 62 in the same figure.

Additionally, the block size is selected to be at least equal to the minimum spacing required between color dots and black dots. Recall that each data bit in the color and K planes corresponds to a dot location on the printed page. Thus, an 8-bit by 8-bit block size is adequate as it exceeds, in both the vertical and horizontal dimensions, the 6-dot minimum ink spacing requirement described above. So a white block between color and black blocks ensures at least the minimum spacing. For example, if the color table has a zero bit, indicating no color bits for a particular block, then it would be permissible to have black ink to one side of that block, and color ink(s) to the other side of that block, as there would be at least eight white bits in between (the intervening block). This exceeds the 6-dot delta minimum spacing requirement, while obviating the need to explicitly check each one of the intervening bits.

FIG. 7A illustrates the concept of a "combined" color plane. Such a combined plane of data may not actually be formed, but is useful here for explaining how data is processed according to the invention. The combined plane represents the logical OR function of all three (CMY) color planes, except that it excludes (i.e. indicates as zero or off) bits which are on in all three color planes. In this regard, it is not precisely the logic function: C OR M OR Y. Rather, it is the logic function: C OR M OR Y AND NOT (C AND M AND Y). Thus, if a particular bit is on in any of the three color planes, but not on in all three color planes, then the corresponding bit will be on in the combined color plane. This combined plane therefore indicates color, but not composite black. The data is partitioned to define a regular array of blocks. In the figure, there are three rows (numbered 1–3) by eight columns (numbered 1–8) in the array. Each block consists of 8 bytes of data.

FIG. 7B shows three bytes of a color table corresponding to the combined color plane of FIG. 7A. Each byte in FIG. 7B corresponds to a row in FIG. 7A; each bit corresponding to one block of data. In FIG. 7A, note for example that the 8 by 8 block for row 1, column 1 of the color plane has bits turned on (value 1), so the bit that represents that block in the color table is also turned on. Blocks in the color plane that have no bits turned on (value 0) are represented in the color table with a zero, as noted above. Even if only one bit is turned on in a block, as appears in row 3, column 2, the corresponding bit in the color table is turned on. The color table of FIG. 7B therefore indicates which blocks in the CMY color planes have color but not composite black.

3. The Black Table

The black table is a compressed representation of the K plane data. The same 8-bit by 8-bit block size is used as in the color table. Accordingly, the black table and the color table are the same size, and each bit location in each table corresponds to the same block location in the K-plane and in the color planes, respectively. FIGS. 8A and 8B shows the relationship between the K plane (FIG. 8A) and the corresponding black table (FIG. 8B). The relationship is essentially the same as that described with respect to FIG. 7, bearing in mind that all three color planes (not shown individually) affect the color table, while the black table reflects solely the single K plane.

Although color and black are mutually exclusive, it is possible for corresponding bits to be on in both the color table and the black table. We do so to indicate that a block is in the question mark state, and, as such, it can not be conclusively determined whether the block is color or black. However, this is only a temporary condition which is resolved prior to printing.

In a preferred embodiment, it is advantageous to surround both the color and black tables with an extra byte (along the top, left, right and bottom edges of the array). These extra bytes are not essential, but they simplify dealing with the special cases of conducting spacing checks (detailed below) along the table edges. Essentially, where an extra byte is provided along an edge of a table, all of the actual data can be processed as explained below, without "running out of data" along the edges of the actual data. Use of these edge or margin bytes will be apparent to those skilled in computer science in light of this specification and the accompanying drawings.

Figure 9:
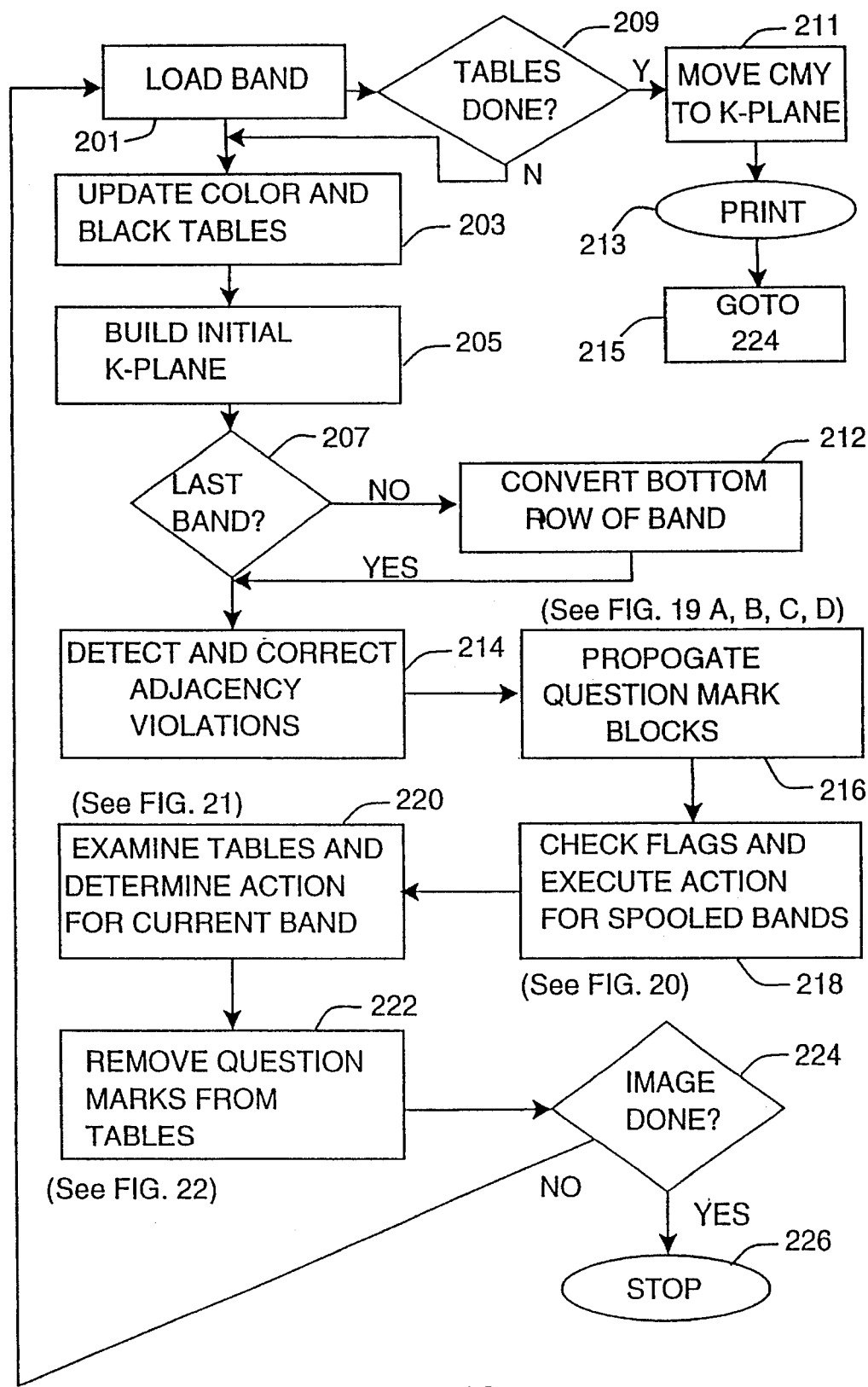
FIG. 9 is a top-level flowchart of the steps taken for each of the bands received of a banded image.

E. Top Level Overview of the Method of Eliminating Spacing Violation on Banded Images FIG. 9 provides an overview of the entire sequence that is executed when each band of the image is received. The process begins with step 201 where the current band of CMY image data is loaded into memory. The band is first checked in step 209 to see whether it is being loaded for the first time or as a result of so-called "new color" being propagated into the current band (see step 214). This condition is indicated by whether the tables already reflect the current band, i.e., are the tables "done." If the tables for the current band have already been constructed, the composite black in the CMY data is moved directly into the K plane according to the black tables in step 211, and the resulting data sent to the printer for printing in step 213.

If the tables are not "done," the color and black tables are updated to include the current band in step 203. From this new image information the K-plane is constructed in step 205. Next, the current band is checked to see if it is the last band on the page in step 207. If not, the black blocks in the bottom row of the current band are converted to question marks in step 212 by turning on the corresponding color bit in the color table. In step 214, the tables are then examined to detect adjacency violations and, if detected, correct them by moving black blocks adjacent to color blocks back into the CMY planes.

Next, analogous to step 214, the tables are examined to detect black blocks adjacent to question mark blocks in step 216 and, if detected, are set to question mark blocks. Once the tables have been updated to reflect the new band, the method checks for any spooled bands and, if detected, beginning with the oldest band, determines the action needed for each spooled band in step 218. It is during step 218 that the band is reimaged if the band was spooled with incorrect image data. Next the method determines what action is required for the current band in step 220. During step 220 the band is spooled if there are existing question marks. The final step for the current band is to remove the question marks for the tables in step 222. If the current band is the final band in the page, step 224, the process is complete (step 226), otherwise the aforementioned steps are repeated. Each of the steps shown in FIG. 9 are discussed in detail below.

F. Update the Color Table and Black Table and K Plane to include the

Current Band (Steps 203, 205, 207, and 212)

Figure 10:
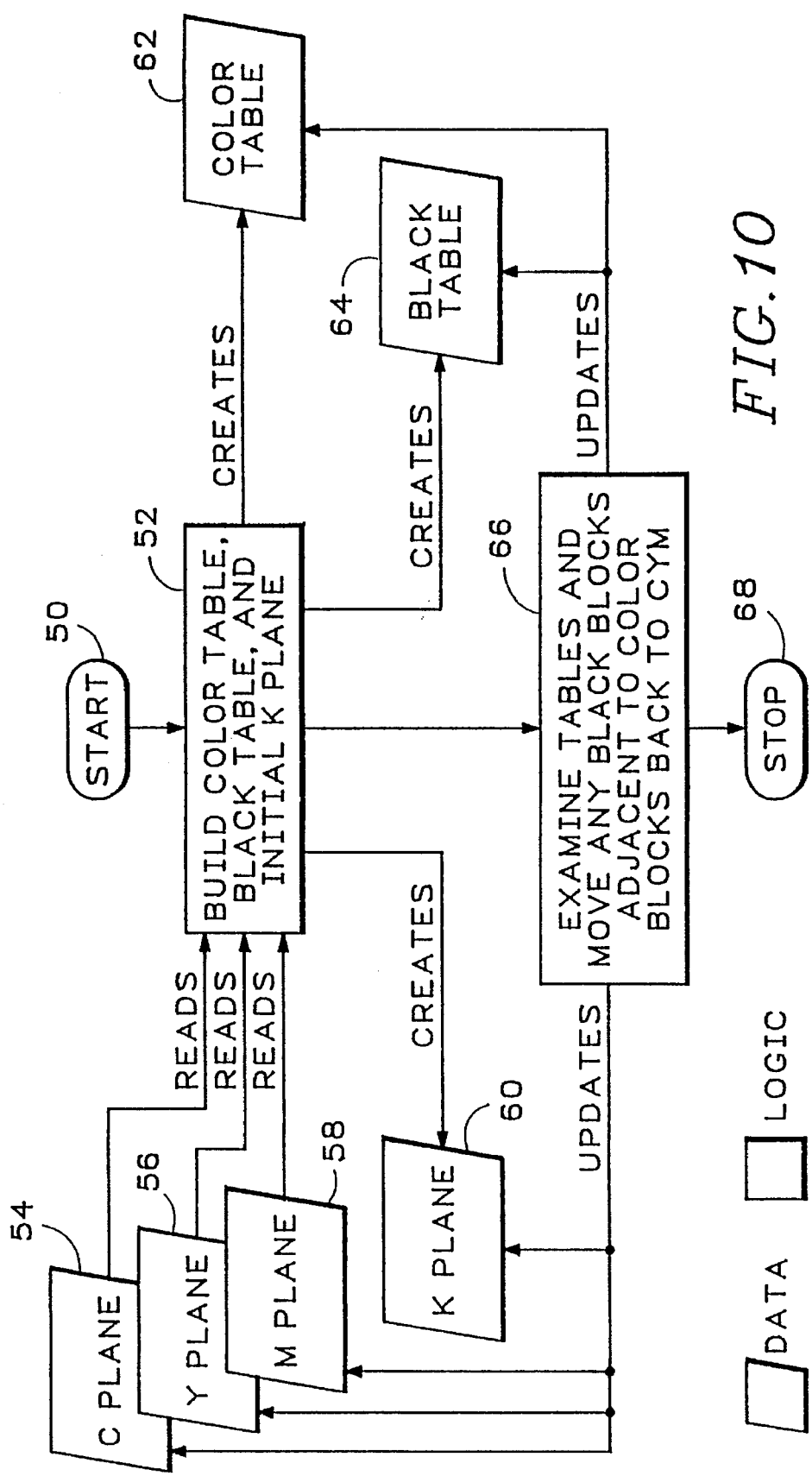
FIG. 10 is a conceptual diagram illustrating a method according to the present invention of processing CMY color data for printing by a 4-color (CMYK) liquid ink printing system so as to maximize use of black ink while maintaining a predetermined minimum spacing between black blocks and color blocks.

FIG. 10 provides an overview of the above data structures and their relationships to the principal steps in the new color separation method. The major steps, in general, are as follows. First, in step 52, is building the color and black tables that represent in a compressed format CMY and K (black) regions on the printed page up to and including the current band. Also, building an initial K plane of data. Next, step 66, is examining the color and black tables to detect color blocks adjacent to black blocks. If such adjacency is detected, changing the adjacent black block to a color block by moving the corresponding K plane data into the color planes for printing as composite black (also part of step 66), thereby enforcing the minimum ink spacing requirements. After there are no black blocks adjacent to color blocks, processing is complete and the color separation is done, stop 68.

Initially, the CMY planes (54, 58, 56) are loaded with the image band to be printed by the windowing system or application. If black is to be printed, the same bit will be on in the CM and Y planes. In step 52, the CMY planes are read and the color and black tables are created as detailed below. Also, the initial K plane 60 is created. This initial K plane is a first attempt at performing color separation, but it may be modified later. Although the CMY planes are overwritten each time a new band is received, the color and black tables remain and are merely updated with the new information. The tables are sized to represent a complete image or page even though only one band is operated on at a time. Initially, each block will correctly be designated as being either black, color, or white. No attempt is made at this stage (step 52) to look at adjacent blocks, i.e. a color block next to a black block, nor to account for the uncertainty at the band boundary. Next these procedures are described in greater detail.

In updating the color table, black table and K plane, the CMY planes are examined in 8-bit by 8-bit blocks. Initially, each block will be designated as being in one (and only one) of the following three states:

1. Color. A "color block" has some combination of CM or Y inks, but not all three, on at least one pixel in the CMY planes. If one dot in the block is color, the entire block is color. A color block is indicated by a 1 or on bit in the color table.

2. Black. In a "black block," the same (corresponding) pixels are on in all three color planes for at least one dot location. A black block is indicated by a 1 or on bit in the black table.

3. White. There are no pixels on in a white block. A "white block" is indicated by zeros or off bits in the corresponding location in both the color and black tables.

Figure 11:
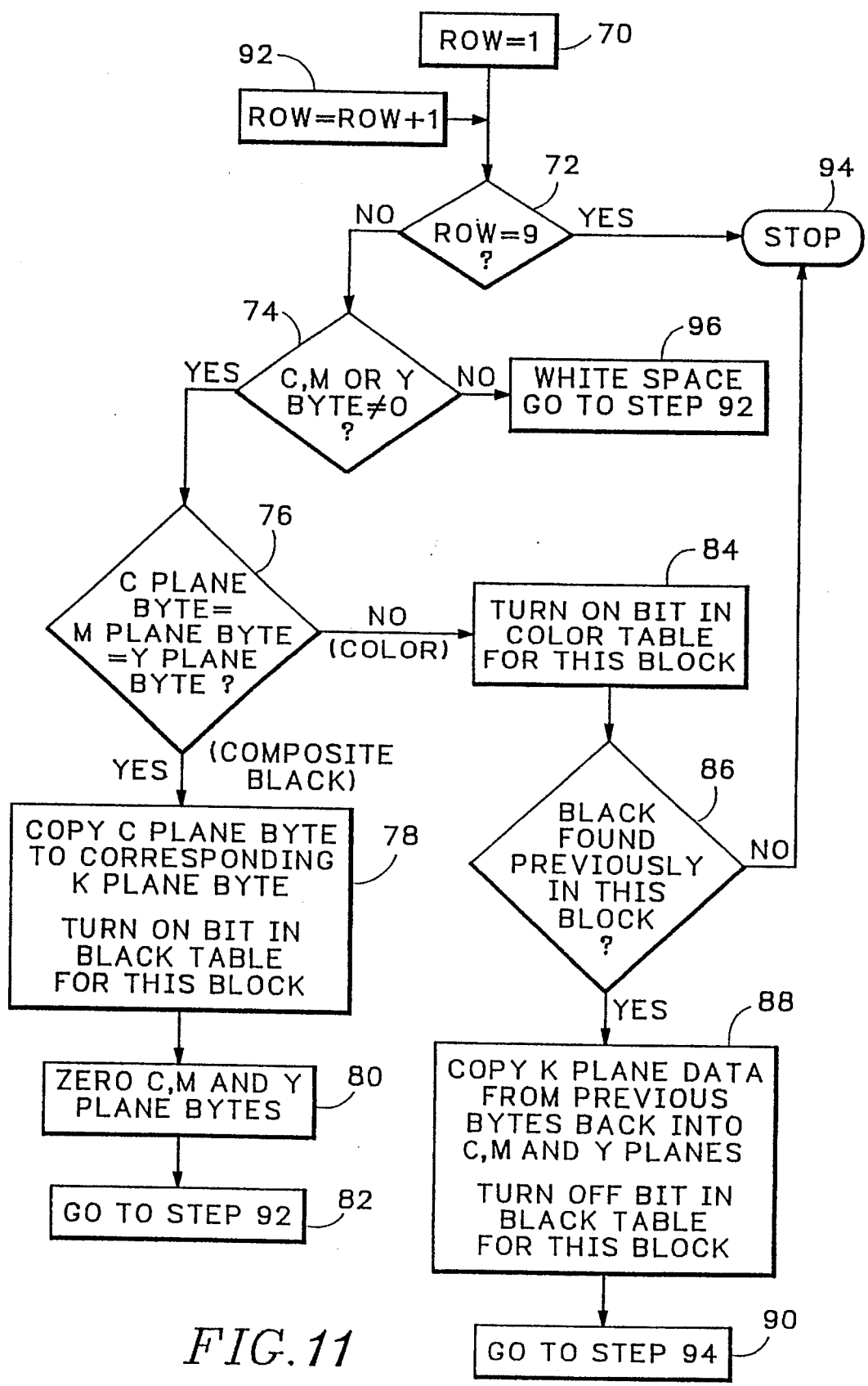
FIG. 11 is a flowchart of a process for determining whether a given block of data is color, white or black, ie. whether a given block should be printed by the color pen or the black pen.

FIG. 11 is a flowchart of a procedure for making these state determinations to build the color and black tables. For the first band, the color and black tables are initially set to all zeros. The procedure illustrated by the flowchart of FIG. 11 is performed once for each 8 by 8 block on a data. Each byte in the block is examined until it can be determined which of the three states—color, black, or white—the block is in. In this description, the block under examination is called the "current block".

Referring to FIG. 11, a variable called row indicates which byte (in the current block) is being examined. The indicated byte is referred to as the "current byte" The procedure begins at step 70 by setting row equal to 1, representing the first byte of the current block. Step 72 tests for the end of the block, given that a block has only 8 rows. Since row is not equal to 9, the method proceeds to step 74. Step 74 tests whether the C, M OR Y byte≠0. If the current byte in each of the CM and Y planes is zero, then current byte represents white space. In that case, we proceed via step 96 to the next byte in the block by incrementing row in step 92.

Alternatively, if the current byte in any of the CM or Y planes is not equal to zero, then the current byte is either a color byte or a black byte. Step 76 determines which one it is. If the C plane byte equals both the M and Y plane bytes, then this byte is composite black.

Data corresponding to the current composite black block is presently represented in the CMY planes. Step 78 copies the data from the C plane (any color plane) to the K plane. Because there is now data in the K plane, the corresponding bit in the black table is turned on (also in step 78). In step 80, the corresponding bytes in the CMY planes are zeroed out (cleared), since the data is now represented in the K plane. Thus, for the current byte, the data has been moved from the CMY planes to the K plane. The method next proceeds (step 82) to examine the next byte in the current block. The foregoing steps 92, 72, 74, 76, 78 and 80 are repeated as long as composite black bytes are found.

If (or when) step 76 determines that the current byte is a color byte, i.e. there are bits on in CM or Y that are not the same in all three, then the entire current block must be designated as a color block, by definition. Accordingly, in step 84, the bit in the color table that corresponds to this block is turned on. Next, in step 86, we test whether or not (e.g. by a flag) black has been detected previously within the current block. (A "black detected" flag would be cleared after each block.) Note that, if black had been found in any of the previous bytes, two things have already happened. First, the CMY data that represented black in an earlier byte was moved to the K plane and erased from the CMY planes. Second, the bit in the black table that represents the current block has already been turned on.

The earlier move of black data from the color planes into the K plane is consistent with the preference given to using black (rather than composite black) wherever possible. Now, however, we have determined that there is color within the same block. Since black is not allowed within the same block as color, we must use composite black for all black within this block. The color pen (CMY) must used to print that data.

Therefore, the next step 88 is copying data that had been determined to be black in the previous bytes from the K plane back into the CMY planes. Also, step 88 turns off the bit in the black table that represents this block. Once color has been found, the process is complete for the current block (step 94). If a block has no data in the CMY planes, the procedure will loop through steps 72, 74, 96, 92 and find nothing.

After the procedure illustrated in FIG. 11 has been applied to each block in the current band of the CMY planes, each block has been designated as color, black or white. If a block is color, the corresponding bit is on in the color table only. For black, the corresponding bit is on in the black table only. For white, the corresponding bits are off in both the color and black tables. Now that the state of each block of data has been correctly determined and entered in a table, those tables can be used advantageously for further processing the data at high speed.

Next, test for last band in step 207, if the current band is not the last band of the page, any black blocks in the bottom row of the band must be set to an indeterminant state (called question marks) since it can not (yet) be determined whether these blocks are adjacent to color blocks on the top row of the next band. Each black block in the bottom row is set to the question mark state in step 212 by turning on the corresponding color bit in the color table. This is done by simply logically ORing each bit along the bottom row of the black table with the corresponding bit in the color table. Implementing a function to accomplish this task should be readily apparent to one skilled in the art.

G. Examining the Tables to Detect Spacing Violations (Step 214)

The next step 214, according to the invention, is to examine each color block, and determine if there are any black blocks adjacent to it. If there is no black block adjacent a color block, then the data does not call for printing black ink within one block (i.e. within eight dots or pixels) of color ink. This criterion more than satisfies the six-dot minimum spacing required to avoid adversely affecting the inks on the printed page.

An adjacent black block can occur in any one of 8 surrounding locations relative to the color block; namely, to either side (in the same row), above or below (in the same column), or diagonally adjacent (i.e. offset by one row and one column in any of the four diagonal directions). The blocks of data are examined implicitly by examining the corresponding tables, where each block is represented by a single bit.

Referring now to FIG. 12A, a color table, one bit is turned on. FIG. 12B identifies the surrounding bits, represented by 1's, that must be checked in the black table. If any one of the surrounding bits in the black table is on or a 1, it signifies that there is a black block adjacent to a color block. Thus, the color and black tables can be used to quickly determine where color blocks are adjacent to black blocks.

It would be excessively time consuming, however, to examine each bit in the color table to determine which bits are turned on, and then identify what surrounding bits to look at in the black table, and then examine each of those surrounding bits explicitly. A faster method of determining when a color block is adjacent to a black block calls for examining bytes instead of bits in the color and black tables, as follows.

1. Using Neighbor Bytes

Note that, for a given 1 bit in the color table of FIG. 12A, three bits above and three bits below must be checked in the black table of FIG. 12B. Additionally, the two bits immediately left and right of the corresponding color bit must be checked in the black table. This can be done quickly and efficiently using "masks" as follows. The first step, for a given 1 bit in the color table (a "color bit"), is turning on its neighbor bits to the left and to the right of the color bit. This is called "smearing" the color bit. We call the resulting byte a neighbor byte.

The next step is logically ANDing the neighbor byte with each byte in the black table that is located in the same column in the row above, the same row, and the row below the current byte in the color table. The result of each ANDing operation is called a mask. For each such AND operation, if the resulting mask is a value not equal to zero, it indicates that there is a 1 or on bit in the black table (a "black bit") located adjacent the location that corresponds to the color bit. Each such black bit represents a black block adjacent the color block represented by the color bit.

This technique is illustrated in FIGS. 13A through 13D. FIG. 13A shows an excerpt from a color table, having a byte (in the second row) with two bits on. FIG. 13B shows the same color table with the left and right neighbor bits turned on (the neighbor byte). FIG. 13C shows the corresponding bytes in an exemplary black table. Finally, FIG. 13D shows the resulting mask after logically ANDing each byte in the black table of FIG. 13C with the neighbor byte of FIG. 13B.

The step of creating a neighbor byte (see FIG. 13B) can be implemented at very high speed as follows. For each byte in the color table there are 256 possible combinations of bits, and there are 256 corresponding patterns of bits (or neighbor bytes) after the neighbor bits have been turned on. These neighbor bytes can be pre-computed and stored in an array (called neighborarray) having 256 entries. Each time the process detects one or more bits on in a color table byte, that color table byte can be used as an index into the neighbor byte array to look up the corresponding neighbor byte. This lookup procedure is represented by step 98 in FIG. 15, in which the neighbor byte array is called neighborarray.

Figure 15:
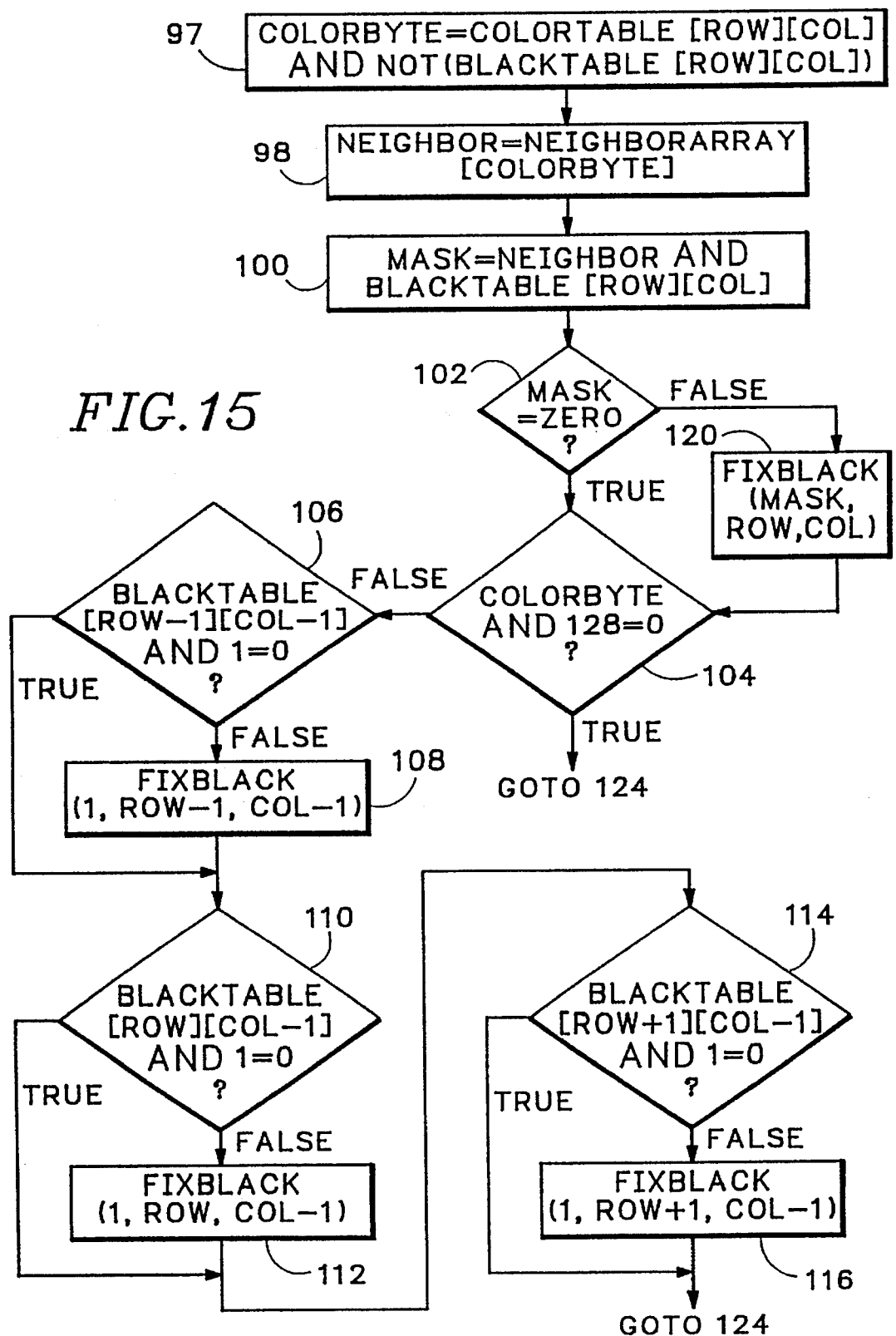
FIGS. 15–17 show a flowchart of a method of examining the color table and black table to detect black blocks which are adjacent to color blocks

Referring now to FIG. 15 (a procedure called findBlack), the first step 97 is to determine which bits in the color table actually represent color blocks rather than question mark blocks. The true color blocks are those blocks which have a corresponding bit on in the color table and not in the black table. Therefore, by ANDing the color table byte with the complement of the corresponding black table byte 97 the true color blocks can be determined (called colorbyte).

The next step 98 is to fetch the neighbor byte for the current color table byte. A variable (called neighbor) is loaded with the appropriate neighbor byte from the look-up table (neighborarray) specified by the true color byte (colorbyte). This variable (neighbor) will be used to quickly determine whether there are any black blocks adjacent to the color blocks represented by the current byte in the color table. Specifically, in step 100, neighbor is logically ANDed with the black table byte in the same row/column location (blackTable[row][col]) to see if there are color blocks adjacent to black blocks. The result byte is called mask.

The next step 102 is testing to determine whether the mask resulting from the previous AND operation is equal to zero. If it is not (false), then there are color blocks adjacent to black blocks. Each on bit (1) in the resulting mask indicates an on bit in the black table byte adjacent the corresponding bit in the color table. This is corrected, step 120, by calling a function called fixBlack, described in detail below. Briefly, fixBlack is a procedure that, for a given mask pattern and row/column pair in the color/black tables, moves the corresponding block of K plane data back into the CMY planes. For each block moved, the corresponding black table bit is turned off and the corresponding color table bit is turned on.

2. Special case—Leftmost Bit in Color Table Byte

The above technique does not address the case in which the "neighbor" bits to be examined in the black table are in a different byte to the left or right. In other words, when the color table bit of interest (a "1") is at either end of the byte, three of the "neighbor bits" in the black table are in a neighboring byte (adjacent the corresponding byte) and must be inspected explicitly. Thus, if the leftmost bit of a color table byte is on, then the rightmost bit of the black table bytes to the left of, upper left of, and lower left of the corresponding byte in the black table must be checked. Similarly, if the rightmost bit of a color table byte is on, then the leftmost bit of the black table bytes to the right of, upper right of, and lower right of the corresponding byte in the black table must be checked explicitly. FIG. 14 illustrates this relationship.

FIG. 14A shows a color table in which the leftmost bit of a byte is on. FIG. 14B shows the corresponding portion of a black table, in which the bits indicated with a "1" and numbered 200, 202 and 204 must be checked to see if the corresponding blocks contain black. FIG. 14C shows another color table in which the rightmost bit of a byte is on. FIG. 14D shows the corresponding portion of a black table, in which the bits indicated with a "1" and numbered 206, 208 and 210 must be checked to see if the corresponding blocks contain black. Accordingly, a procedure for checking adjacent bits must be able to cross byte boundaries in these special cases.

In general, if any bit is on in a color table byte, it is necessary to detect every occurrence of a black table bit that is on adjacent the bit location in the black table that corresponds to the on color table bit.

Figure 16:
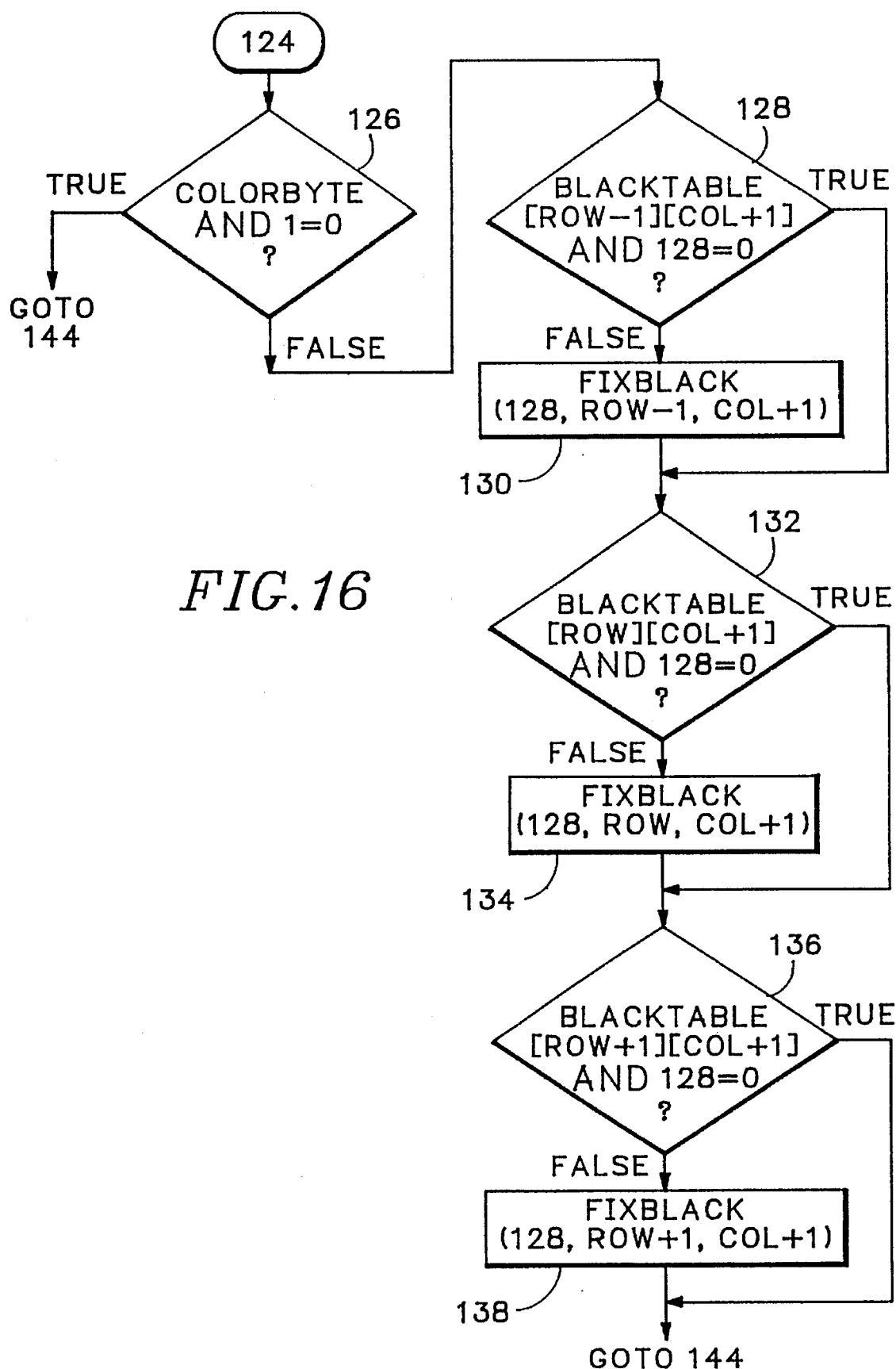

Referring once again to FIG. 15, if step 102 result is True, there is no conflicting bit in the black table within the current byte. However, it remains to check for the special cases noted above. First, step 104, is determining whether the leftmost bit in the current color table byte is on. This is conveniently (and quickly) done by logically ANDing the current byte (colortable [row][col]) with the number 128 and checking for zero—step 104. If the leftmost bit is not on (step 104=True), then checks of all three bytes in the black table to the left (above, same row, and below) can be skipped, so control passes to 124 (FIG. 16). If the result of step 104 is False, then the leftmost bit of the current (color table) byte is on. Therefore, it remains to examine adjacent black table bytes to the left, as follows.

In step 106, the indexes for the black table are [row−1] and [column-1]. This location corresponds to bit 200 in FIG. 14B. This byte in the black table is ANDed with the number 1 and the result checked for zero in step 106. In other words, the "mask" is a binary one, which is a byte with only the rightmost bit turned on. If the result of step 106 is False, the rightmost bit of this black table byte is on, adjacent to (above and left of) the leftmost bit of the color table byte. Accordingly, in step 108, fixBlack is called to move the corresponding black block to the CMY planes. If the result is True, the rightmost bit of this black table byte is off (zero), and we proceed to step 110 directly without calling fixBlack.

Next, in step 110, the black table byte at [row], [column−1] is examined. This location corresponds to bit 202 in FIG. 14B. If the rightmost bit of that byte is on, i.e. step 110 result=False, the rightmost bit of this black table byte is on, adjacent to (left of) the leftmost bit of the color table byte. Accordingly, in step 112, fixBlack is called to move the corresponding black block to the CMY planes. If the result is True, the rightmost bit of this black table byte is off (zero), and we proceed to step 114 directly without calling fixBlack.

Finally, in step 114, the black table byte at [row+1], [column−1] is examined. This location corresponds to bit 204 in FIG. 14B. If the rightmost bit of that byte is on, i.e. step 114 result=False, the rightmost bit of this black table byte is on, adjacent to (below and left of) the leftmost bit of the color table byte. Accordingly, in step 116, fixBlack is called to move the corresponding black block to the CMY planes. If the result is True, the rightmost bit of this black table byte is off (zero), and we proceed to step 124 (FIG. 16) directly without calling fixBlack.

At this point, for the current color table byte, the same byte in the black table has been checked, and if necessary, the three bytes to the left have been checked. What is left to do is check the bytes above, below and to the right of this color table byte.

3. Special case—Rightmost Bit in Color Table Byte

Figure 17:
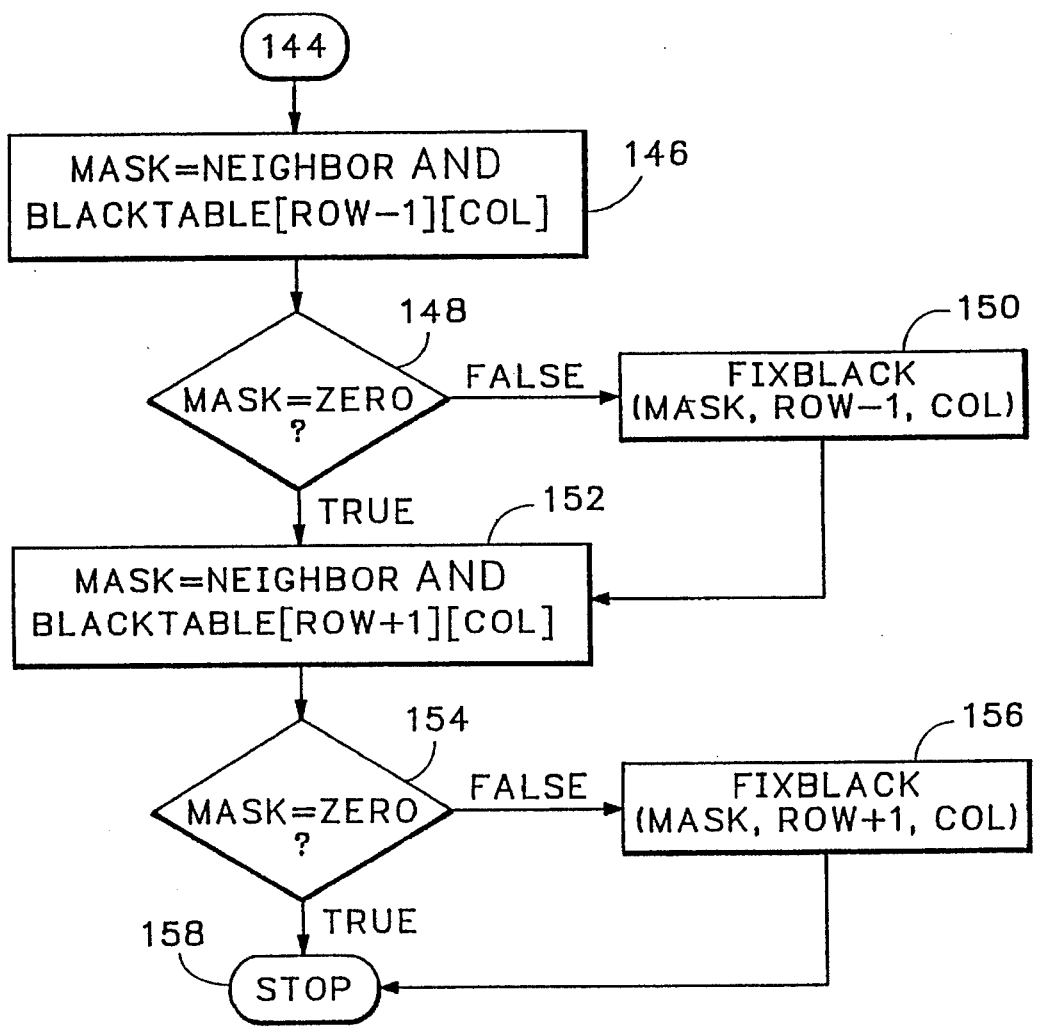

Referring now to FIG. 16, refer to label 124. The first step 126 is to examine the rightmostbit of the current color table byte. This is done by logically ANDing the byte with the binary number 1 and testing the resulting byte for zero—step 126. If the rightmost bit is on, result=False, each of the three adjacent bytes to the right in the black table must be checked to see if the leftmost bit is turned on. This process corresponds to checking bits 206, 208 and 210 in FIG. 14D. If the rightmost bit of the color table is not on, result=True, these checks can be skipped, so go to label 144 (FIG. 17).

Each of these bytes is checked in turn, in step 128 (above and to the right); step 132 (same row—to the right); and step 136 (below and to the right). The procedure is similar to that employed for checking bytes to the left side, described above, so detail may be omitted. Note however that in FIG. 16 the adjacent bytes are ANDed with the number 128 so as to detect the leftmost bit in the blacktable byte, whereas the mask used in FIG. 15 was the number 1 to detect the rightmost bit. After checking each black table byte, the fixBlack procedure is called, as described above, to move data as necessary.

4. Testing Bytes Above and Below the Current Byte

Lastly, the bytes above and below must be checked. More precisely, it remains to examine the black table bytes above and below the black table location corresponding to the current color table byte. Referring now to FIG. 17, start at label 144. In the first step 146, mask is set to the value of neighbor logically ANDed with the byte from the black table above the color table byte. Thus, the black table index is set to [row −1][col]. Recall that the value neighbor corresponds, for example, to the byte shown in FIG. 13B. It is the current color table byte with neighbor bits turned on. If the corresponding black table bytes are as shown in FIG. 13C, the results after ANDing each black table byte with the neighbor byte are as shown in FIG. 13D.

The next step 148 checks to see if the resulting value (mask) is equal to zero. If it is not equal to zero (False), there are black blocks adjacent to color blocks, and fixBlack is called with the appropriate values in step 150. The next step is to examine the black table byte below the color table byte. If the result of step 148 is True, we proceed to the next test without calling fixblack in step 150.

The next step 152 is to set mask to the value of neighbor ANDed with the byte from the black table below the color table byte. Thus, the black table index is set to [row+1][col]. Step 154 checks to see if the resulting value is equal to zero. If mask is not equal to zero (False), there are black blocks adjacent to color blocks, and in step 156 fixBlack is called to correct the violation. If mask is equal to zero (True), the process is completed and stops 158.

At this point, for the current color byte only, the method has checked all possible surrounding bits in the black table. For any black block adjacent to a color block, that black block was moved from the K plane back to the CMY planes, and the color and black tables updated accordingly. The foregoing procedures illustrated in FIGS. 15–17 are repeated for each byte in the color table that has at least one bit on.

H. Moving data from the K plane to CMY planes (fixBlack)

Figure 18:
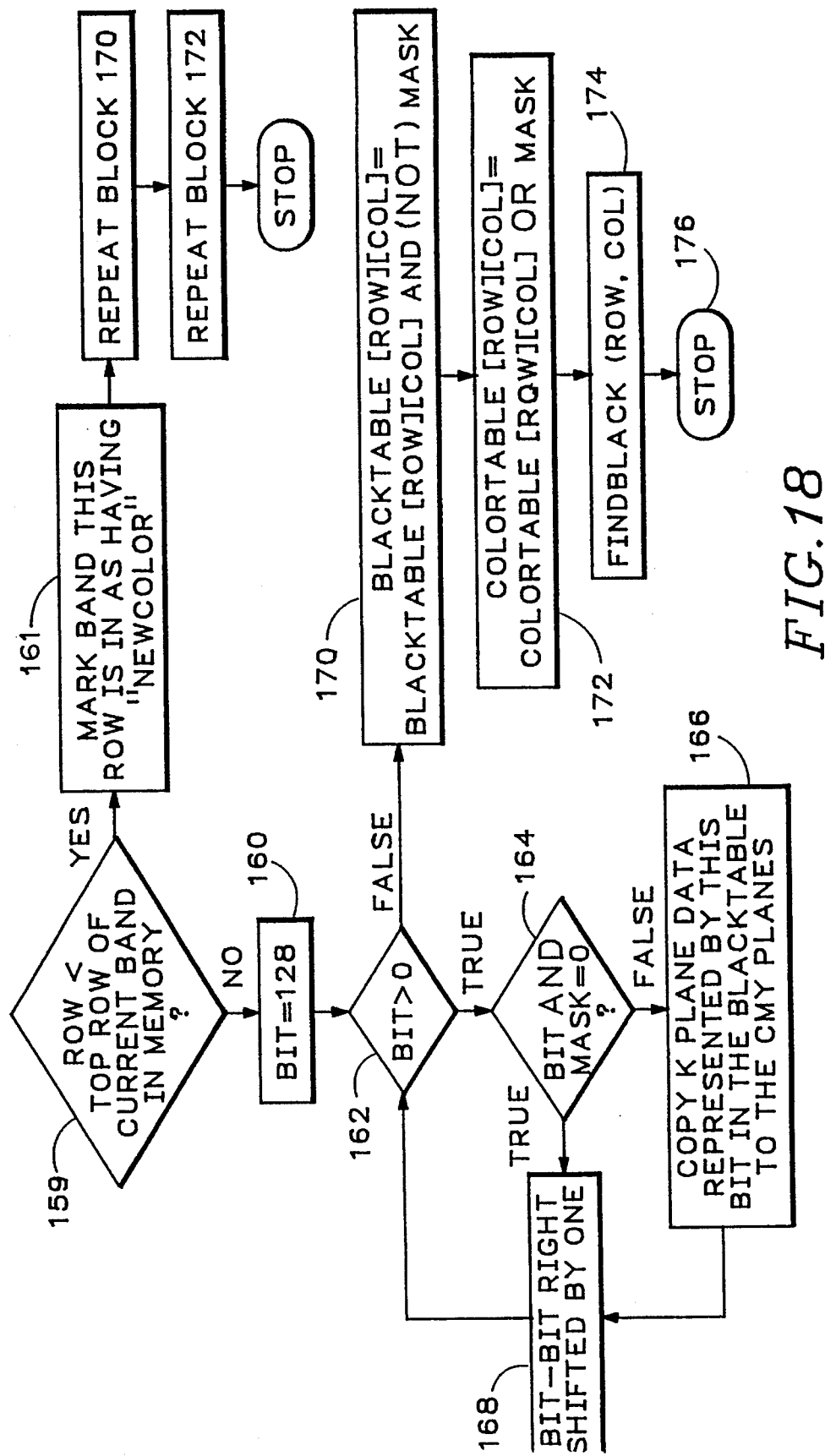
FIG. 18 is a flowchart of a method of moving selected data from the black plane into the color planes in order to correct minimum spacing violations
Figure 19A:
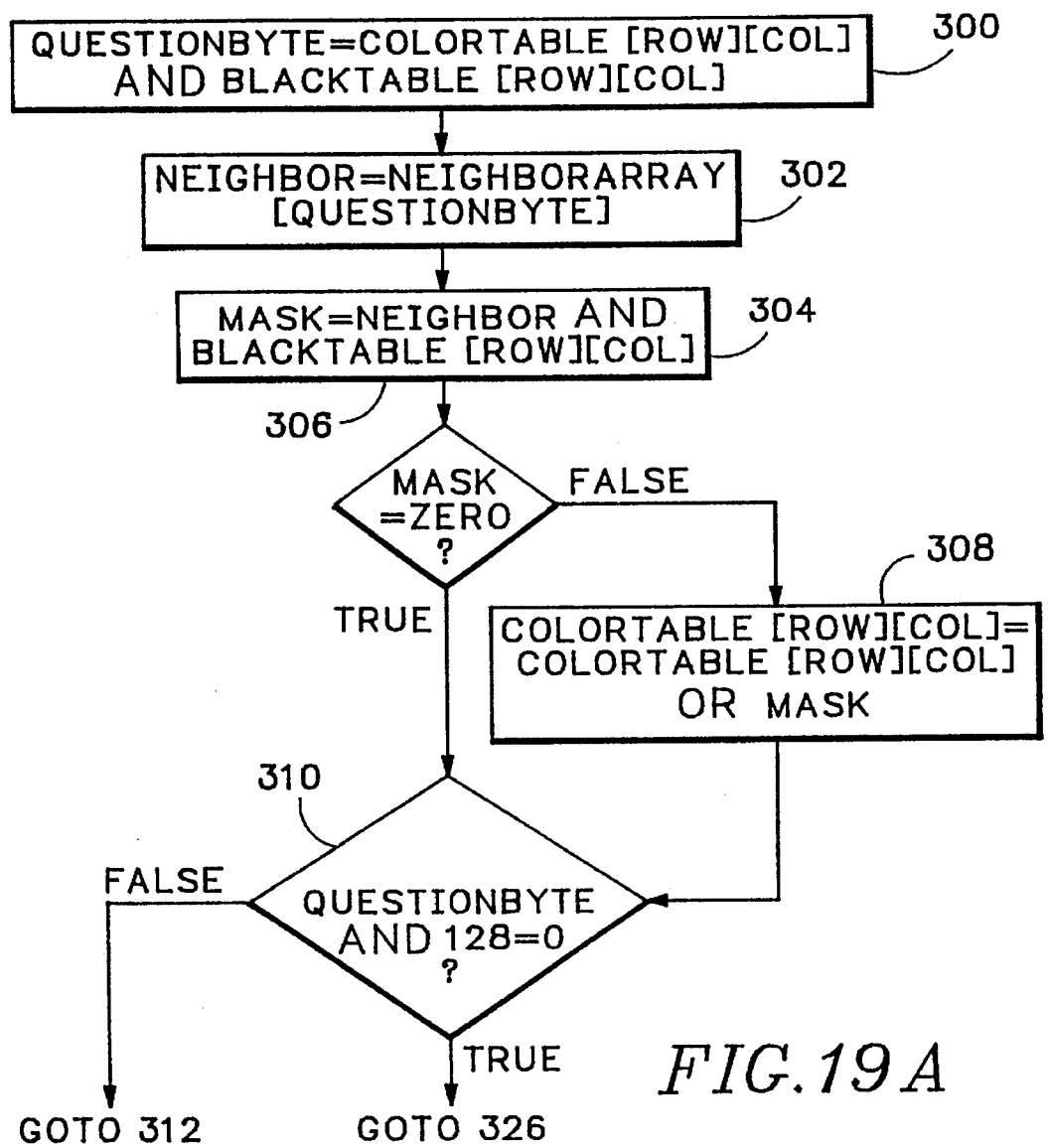
FIGS. 19A–19D show a flowchart of a method of examining the black and color tables to detect black blocks which are adjacent to question mark blocks.
Figure 19B:
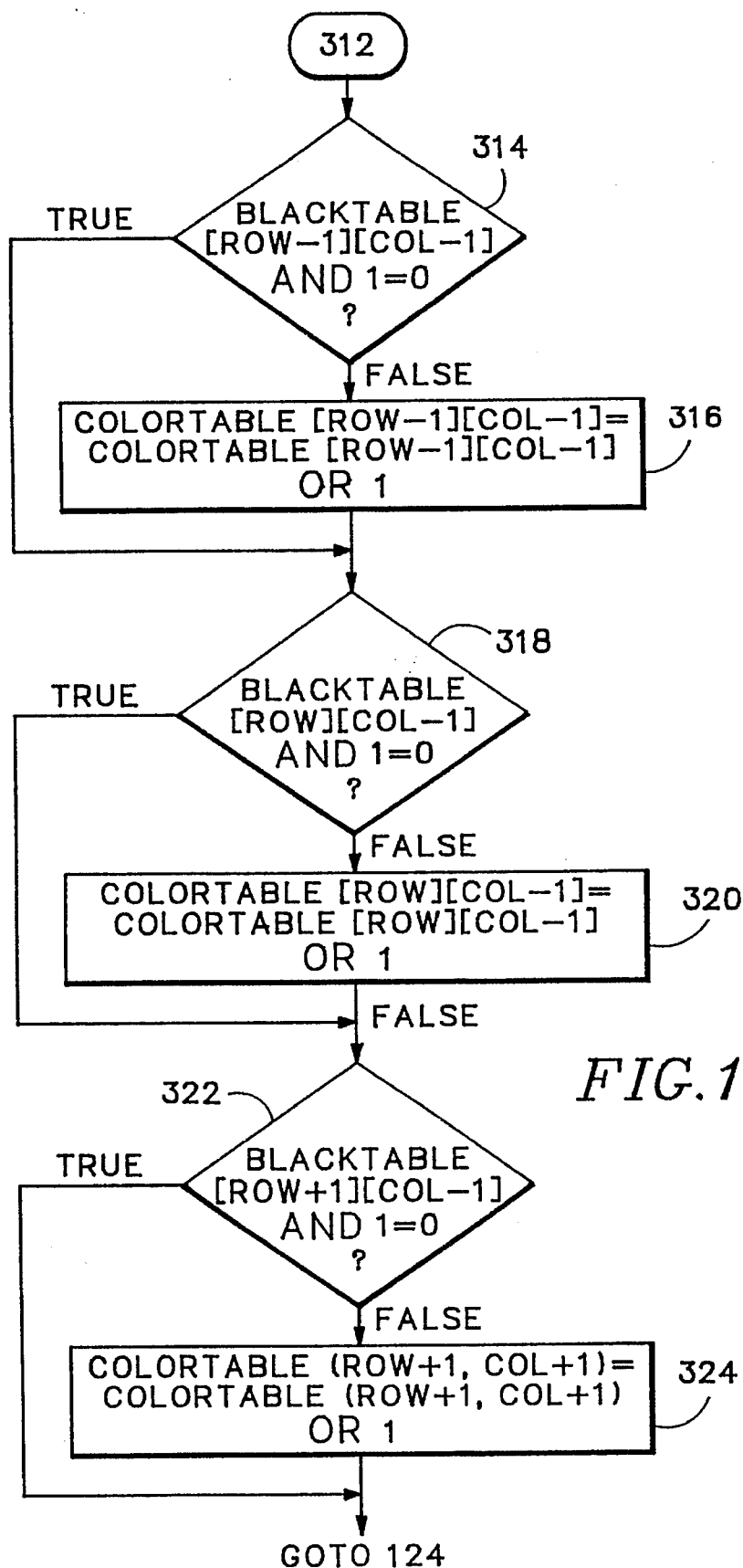
Figure 19C:
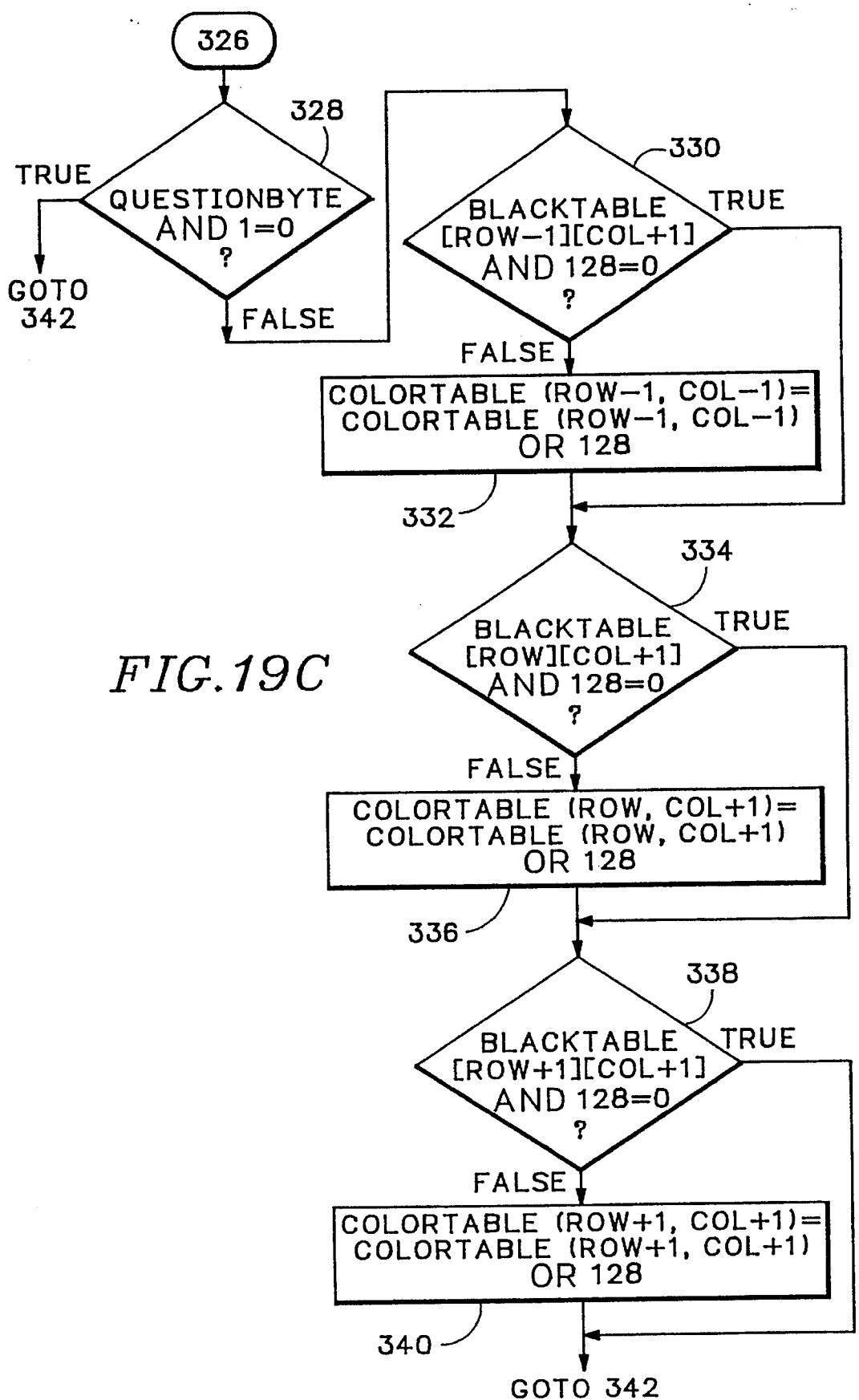
Figure 19D:
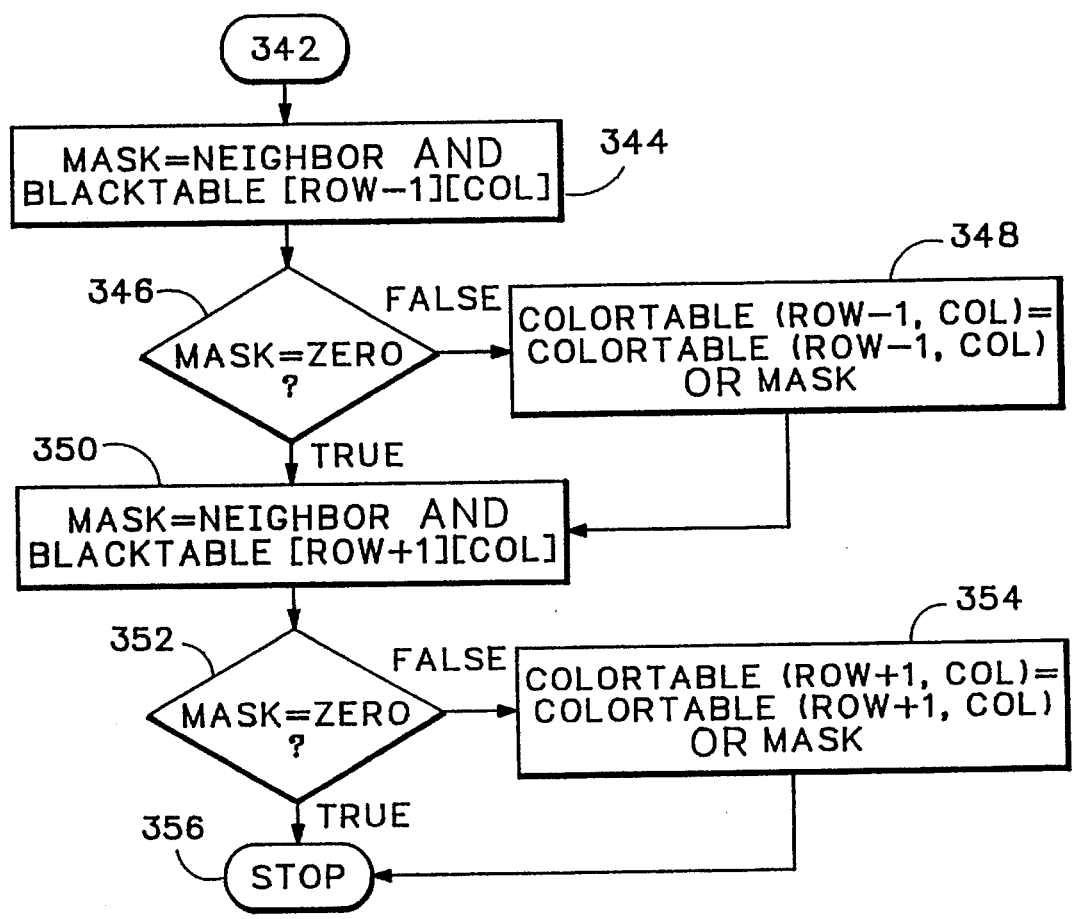

A preferred method of moving dam from the black K plane back into the CMY color planes is arbitrarily called fixblack, as noted above. This method is illustrated in the flowchart of FIG. 18. The function fixBlack is passed three data—mask, row and col (column). Row and column are the address or index of the current byte. fixblack is called when that byte in the color and black tables represents black adjacent to color. The mask, itself a byte, indicates (by a 1) which bit in the current byte represents the black block to be moved. More than one bit may be on in the mask.

Referring to FIG. 18, in the first step 159, the row is checked to see if it is less than the top row of the current band. If so, then the corresponding band is marked as having new color 161. The new color flag indicates that black data was moved to color data in a previous band. The new color flag indicates that a spooled band contains invalid data and must be reimaged before being issued to the printer for printing. The description of how the new color flag is used is described in detail below. As a result of the invalid data it is unnecessary to move the black data to the color data. Instead, just update the black table as shown in step 170 and the color table as shown in step 172, both explained below.

If, instead, the row is greater than or equal to the top row of the current band, a value called bit is initialized to 128 in step 160, the leftmost bit of a byte. The bit will be shifted to the right, and at each shift, will be used to see if the same bit is on in the mask. If so, then the corresponding block that must be moved from the K plane to the CMY planes. Step 162 checks that the value of bit is still greater than zero. If so, bit is ANDed with the mask in step 164. If the result is not equal to zero (False), then in step 166 the K plane data represented by this bit in the black table is moved to the CMY planes. Next, in step 168, the bit value is shifted right by one, and the testing continues for the rest of the byte.

After each of the eight bits in the mask are tested, the black and color tables must be updated. In step 170, the black table byte is replaced by itself logically ANDed with the binary complement of mask. In computer shorthand:

blackTable[row][col]=blackTable[row][col] AND NOT mask This step turns off the mask bits in the black table. Next, in step 172, the color table byte is ORed with the mask, thereby turning on the mask bits in the color table.

Importantly, for the current byte in the color table, there are now new entries. The corresponding new color blocks might be adjacent to existing black blocks, which would violate the minimum spacing requirements. Therefore, in step 174, findBlack must be called (again) for the current row/column. findBlack refers to the procedures for finding and correcting adjacency violations, detailed above with reference to the flowchart of FIGS. 15–17. The methods called findBlack and fixBlack may be arranged to operate recursively, though that is not essential. The specific implementation is a matter of design choice, as long as processing continues until all minimum spacing violations are detected and corrected. Is some cases, as shown below, changing data can "propagate" over an entire page.

I. Propagating Question Marks in the Tables (Step 216)

The step of detecting spacing violations between black blocks and question mark blocks and propagating question marks is analogous to that of detecting spacing violations between black blocks and color blocks and propagating color. Referring now to FIGS. 19A–19D, thefindBlack routine has been modified to detect spacing violations between black blocks and question mark blocks. In contrast to findBlack, the method of propagating question marks begins in step 300 by identifying the question marks present in the byte specified by the row and column addresses. The question mark blocks are easily identified by those blocks which have the corresponding bits on in both the black table and the color table. The remainder of the method is identical to that of findBlack except that where findBlack called fix-Black the method shown in FIGS. 19A–19D merely turns on the corresponding bit in the color table, i.e., set the bit to a question mark, by ORing the bit with a "1." Thus, the findBlack routine could be modified to handle both cases with the addition of an additional parameter which would indicate whether to propagate color or question marks.

J. Examining Spooled Bands (Step 218)

As previously indicated, a spacing violation within the current band can not necessarily be resolved due to the possibility of color data in the next band within the predetermined distance from black data in current band. If the current band can not be resolved, i.e., there are question marks within the current band, all of the remaining question mark blocks are converted to black blocks and the current band is spooled to the secondary storage device. It is assumed that question marks will resolve to black because of the predominance of black on the printed page and also because of the desirability of printing in true black.

Figure 20:
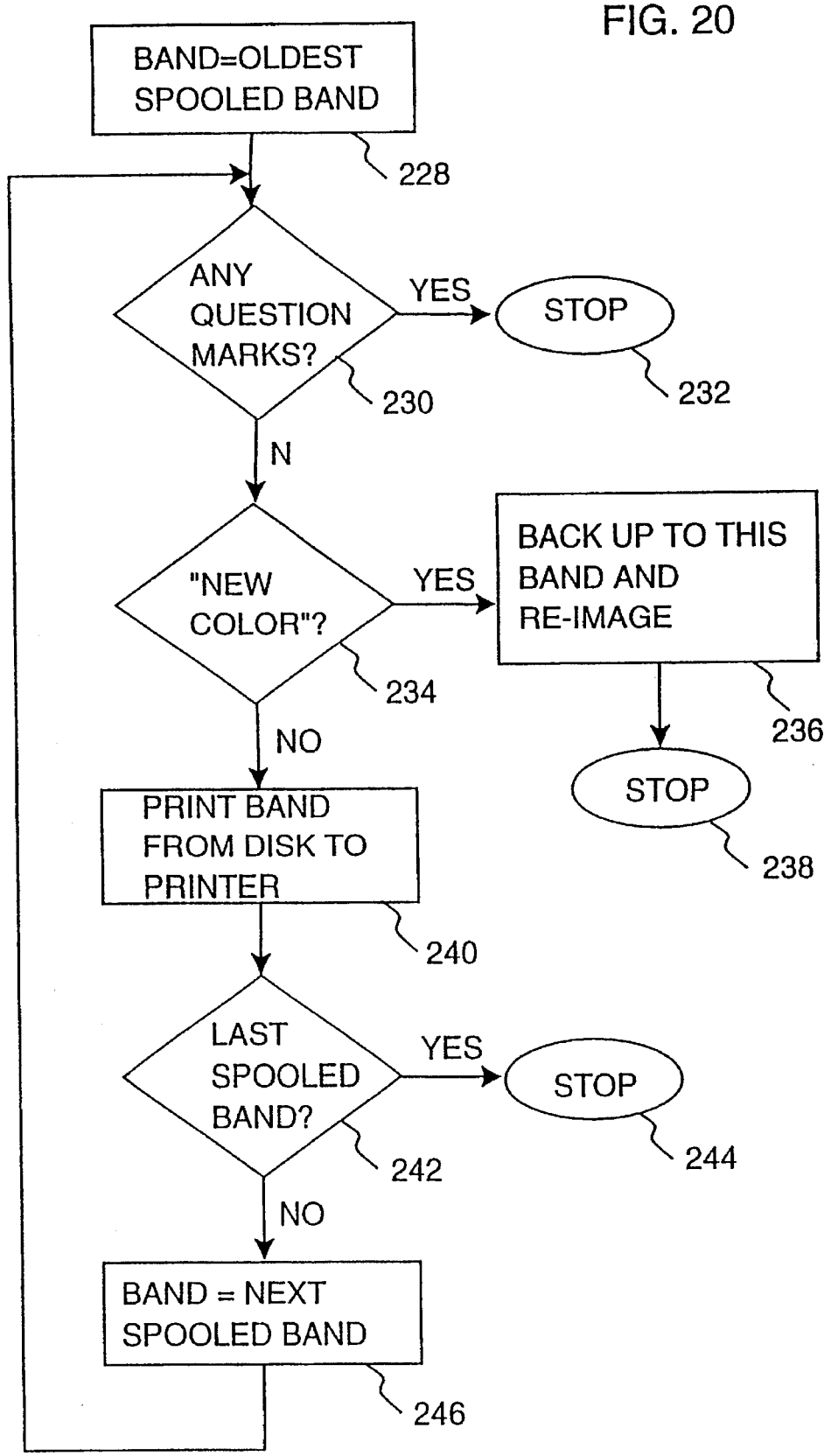
FIG. 20 shows a flowchart of a method of examining each of the spooled bands to determine the action required for each.

Before the current band is examined for the existence of question marks, all of the other spooled bands are examined on a first-come-first-serve basis. The process for examining all of the spooled bands is shown in FIG. 20. The first step is to set the band to be examined to the oldest spooled band 228. This band is then examined for the existence of question marks 230 by examining the regions of the black and color tables that represent the band under examination. If the band has any question marks, they must have propagated up from subsequent bands (after the current band was spooled) and, therefore, all subsequent bands have question marks. It is then unnecessary to examine any other bands 232. By first checking for question marks, we will never re-image a band that has question marks in it. This ensures that when a band is re-imaged, the black and color tables will be complete, and have no question marks.

If the band under examination does not have any question marks, we check in step 234 to see whether any new color is present. What is meant by new color is that question marks that were assumed to be resolved to black were actually resolved to color. Therefore, the spooled data is erroneous and needs to be discarded. The spooled band must be re-imaged in step 236. When the band is reimaged, the method essentially reenters the flowchart shown in FIG. 9 at step 201. Since the tables are fully and accurately reflect the requested band, the tables are "done" and the method can proceed to step 211. Fortunately, the color and black tables are correct and so the correct K-plane and CMY-planes can be quickly reassembled. After the planes are assembled they can be sent directly to the printer in step 213 for printing.

If there is no new color, the spooled band was spooled correctly and the spooled band is sent to the printer for printing in step 240. If the band is the last spooled band 242, the process is complete at step 244. Otherwise, the band to be examined is set to the next spooled band in step 246 and the sequence is repeated. In this way, all of the spooled bands are examined after each new band is received to determine if any have been resolved, and, if so, dispose of the band appropriately.

K. Examining the Current Band (Step 220)

Figure 21:
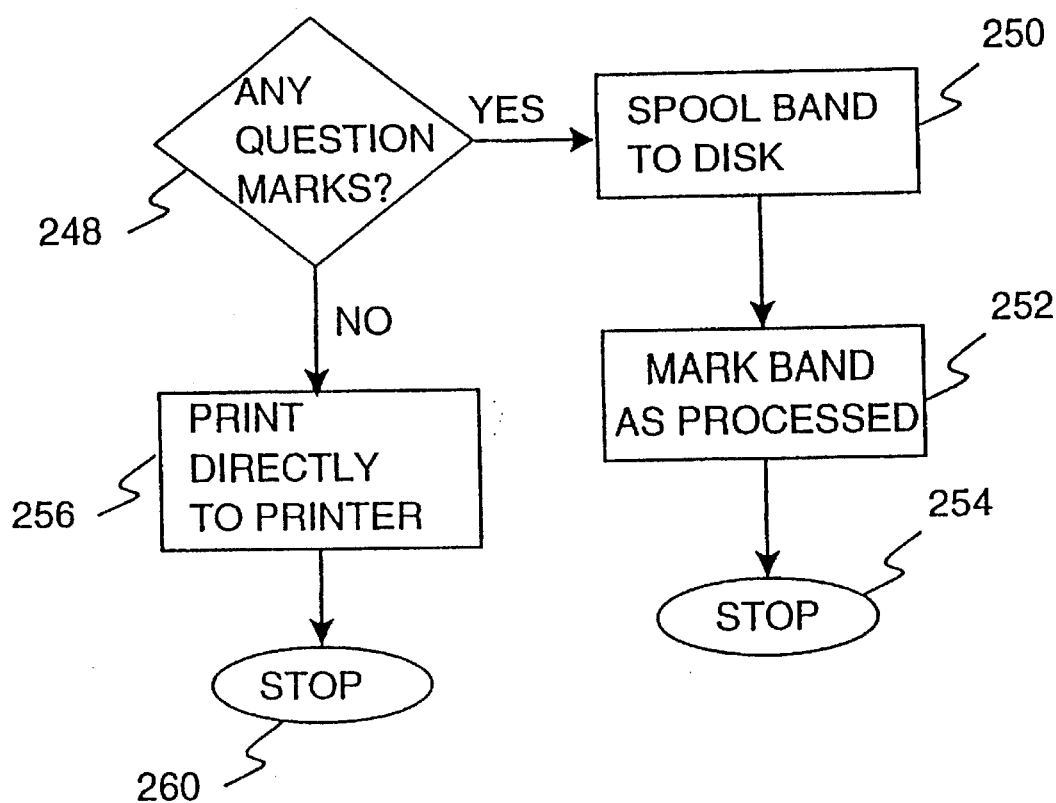
FIG. 21 shows a flowchart of a method of determining the action required for the current band.

Referring now to FIG. 21, after the spooled bands have been examined the current band is examined in step 220. The processing of the current band is quite simple. The first step in 248 is to determine whether there are any question marks within the current band. If there are question marks, the band must be spooled in step 250 to await subsequent bands. If the band is spooled to disk, the band is marked as processed in step 252, which is used to determine whether the band is "done" in step 209 of FIG. 9, and the processing of the current band is complete. If, however, there are no question marks in the current band, the band is sent directly to the printer in step 256 and the process complete. In the case where there are no question marks in the current band, it is assured that there are no question marks in any spooled bands since they would have had to propagate up from the current band. Thus, since there are no question marks remaining in any spooled bands, and since the spooled bands are examined before the current band, it is also assured that the spooled bands have already been printed. Therefore, the current band is assured of being printed in the proper order.

L. Removing the Question Marks (Step 222)

Figure 22:
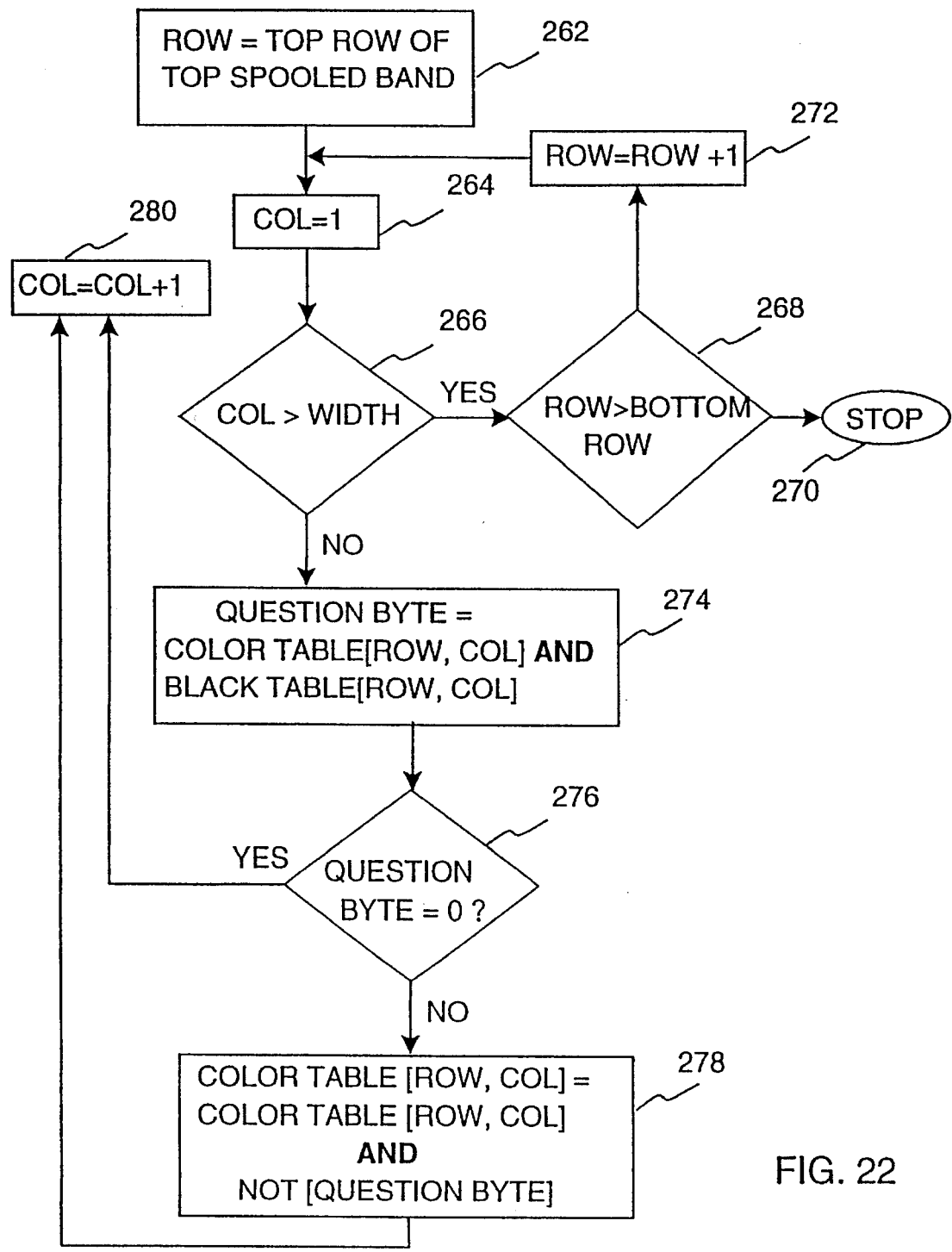
FIG. 22 shows a flowchart of a method of removing the question mark blocks from the color table.

The final process step for each band received is removing the question marks from the tables in step 222. An expeditious method of removing the question marks is shown in FIG. 22. The process begins in step 262 by setting the row equal to the top row of the spooled band. Next in step 264 the column is initialized by setting it equal to 1. If the column is less than the width of the black table, the current question byte is extracted from the tables by ANDing the color table byte and the corresponding black table byte in step 274. If the there are no question marks in the current question byte (step 276), the column is incremented in step 280 and the sequence is repeated. If, however, there are question marks in the current question byte, the question marks are eliminated by ANDing the current byte in the color table with the complement of the question byte in step 278. The method continues while the column is less than the width of the black table (step 266) and the row is less than or equal to the bottom row of the current band (step 268).

M. Example Illustrating Basic Operation of the Invention

Figures 23A, 23B, 23C:
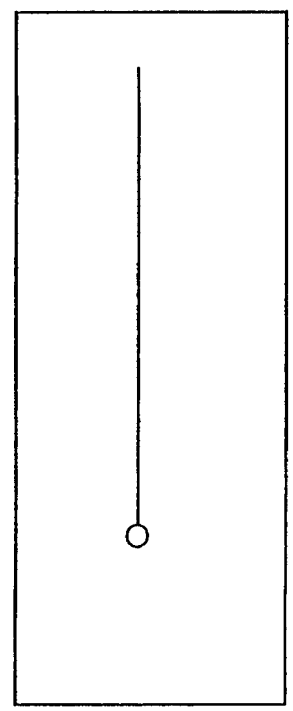
FIG. 23A is an example of a black table that corresponds to the image of FIG. 23C.
FIG. 23B is an example of a color table that corresponds to the image of FIG. 23C.
FIG. 23C illustrates a graphic image having a vertical black line and, touching the lower end of the vertical line, a circle to be printed in color ink.

FIGS. 23–25 illustrate an example of operation of the invention. FIG. 23C illustrates a graphics image. In that image, the vertical line is to be printed black. At the lower end of the vertical line is a circle indicating color ink. The black line thus abuts the color ink. In CMY color plane data, the black line would be represented as composite black, and the circle as the desired color.

Initially, all of the composite black data is moved out of the color planes and into a K plane for printing as true black. FIG. 23A shows the contents of a black table and FIG. 23B shows the contents of a color table after this initial processing has been completed. Only a single bit remains on in the color table (row 12), indicating the color ink (the circle) in the image of FIG. 23C. A series of 1's in the black table now represent the vertical black line in the image. The initial table building corresponding to step 52 in FIG. 10 has been completed.

The next step is to examine these tables to detect black adjacent color and make any necessary corrections. When the sole color bit is examined, the method will detect an adjacent black bit, namely the black bit directly above the black table location that corresponds to the color bit. Specifically, in step 146 (FIG. 17), mask=0011 1000 (neighbor) AND 0001 0000 (blackTable [row–1][col]). The result is 0001 0000, so step 148 (mask=zero?) result is False. Accordingly, in step 150, fixBlack is called to correct the minimum spacing violation fixBlack is passed the mask to identify the offending table bit, and the table row and column locations. In this example, fixBlack receives the parameters: 0001 0000 (mask), 11 (row eleven), 1 (column 1—only one column in the example). fixBlack moves the corresponding block of data from the K plane back into the color planes, and updates the black and color tables accordingly (see FIG. 18). As a consequence, the bit directly above the color bit in FIG. 23B is turned on. And the corresponding bit in the black table is turned off.

Next findBlack is called, i.e. the procedure of FIGS. 15–17, to check the black table bits surrounding the new color table bit (in row 11) to detect black adjacent color once again. The black table bit in row 11 is now off, and is not at issue. But the black table bit in row 10 is detected as being adjacent the color table bit in row 11. Therefore, as before, the corresponding block of data is moved from the K plane back into the color planes. The tables are updated, i.e. the color table bit in row 10 is turned on, and the black table bit in row 10 is turned off.

Figures 24A, 24B, 24C:
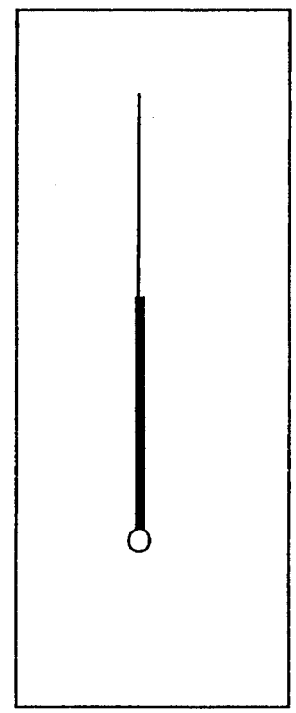
FIG. 24A illustrates the black table of FIG. 23A after partial processing during which black blocks adjacent color blocks have been changed to color blocks and such changes have propagated partway up the vertical line of the corresponding image.
FIG. 24B shows the color table of FIG. 23B after the partial processing described with respect to the black table of FIG. 24A.
FIG. 24C illustrates an image that corresponds to the data shown in tables of FIGS. 24A and 24B.

Once again the current color table bit, now row 10, is examined to detect adjacent black bits in the black table. The black bit in row 9 will be detected and, as before, the corresponding block of data moved from the K plane back into the color planes. It may be seen that the foregoing steps are repeated, each cycle moving a block of data from the K plane back into the color planes. After five cycles, the data are as illustrated in FIG. 24A (black table) and FIG. 24B (color table). The data shown in the tables of FIG. 24 is represented by the image of FIG. 24C. Referring to FIG. 24C, the heavy (lower) portion of the vertical line represents composite black, while the finer (upper) portion of the line represents true black. This illustrates graphically how the composite black is "propagating" up from the color region.

Figures 25A, 25B, 25C:
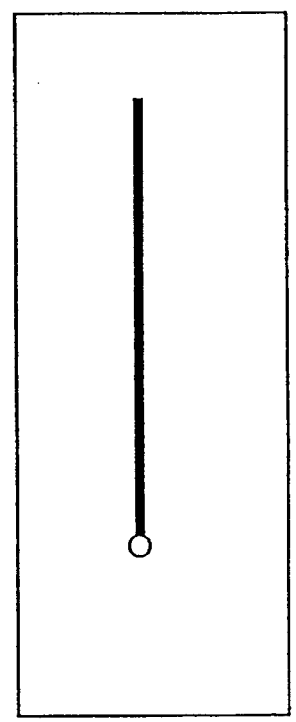
FIG. 25A shows the black table of FIGS. 23A and 24A after completion of processing to enforce a minimum spacing requirement between color dots and black dots.
FIG. 25B shows the color table of FIGS. 23B and 24B after completion of the processing to enforce the minimum spacing between color dots and black dots.
FIG. 25C illustrates an image that corresponds to the data shown in the tables of FIGS. 25A and 25B.

Note that, at this point in the process, a violation of the minimum spacing requirement still exists where the composite black touches black, since composite black is composed of color ink. Referring to the tables of FIG. 24, it may be seen that the color bit in row 7 is adjacent (below) a black bit in the same position in row 6. Accordingly, the foregoing process continues until all of the black data has been converted back into composite black data. The final result appears in the tables of FIG. 25A (black table) and FIG. 25B (color table). The data shown in the tables of FIG. 25 is represented by the image of FIG. 25C. In that image, no black ink is printed adjacent color ink. It may be observed, in this example, that correction of an initial adjacency violation resulted in a new violation, correction of which resulted in yet another new violation, etc., so that the correction "propagated" over the entire image.

N. Banding Example Illustrating Operation of the Invention

Figure 26:
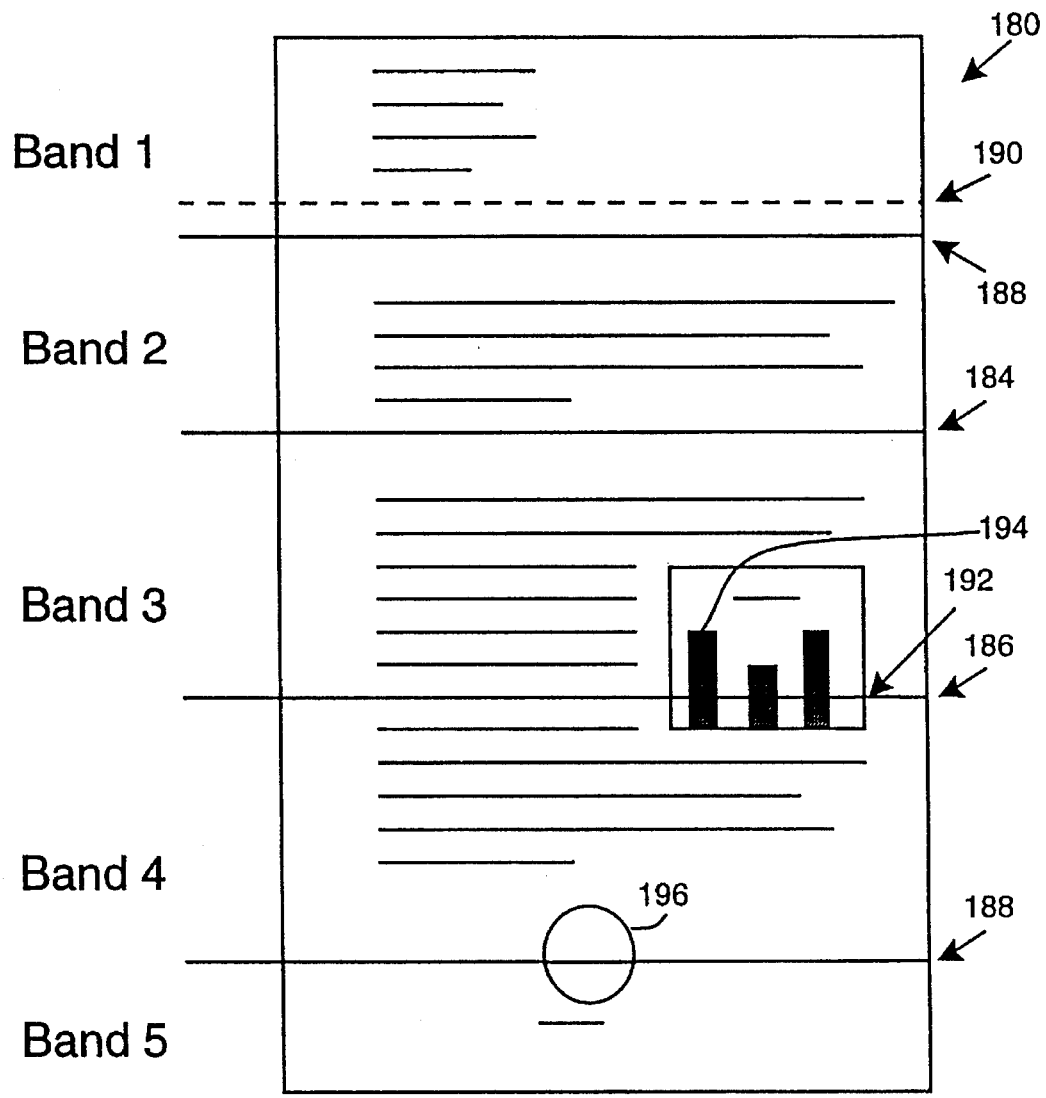
FIG. 26 shows a banded image with the band boundaries shown as horizontal lines across the page.

Referring now to FIG. 26, a banded page to be printed is shown generally at 180 with band boundaries 182, 184, 186, 188 drawn horizontally across the page. The page is comprised of five separate bands, i.e. Band 1–5, each not necessarily comprising the same amount of the page as the other. The actual number of bands used to comprise the page can vary as well. The bars 194 in Bands 3 and 4 are color. The vertical and horizontal lines, including the border around the bars, are black.

The CMYK planes for Band 1 are brought into memory. The first step is marking blocks as black or color. There is only black data in Band 1, and there is no black data within a predetermined spacing from the band boundary, as indicated by broken line 190. The resulting black table has no blocks in the bottom row of the black table corresponding to band one. Therefore, this band is sent directly to the printer. Band 2 is treated the same way as band one, and is sent to the printer.

Band 3, however, does contain both black and color data. After the black and color blocks are marked in Band 3, there are black blocks on the bottom row of the band in the black table. Note the border around the bar chart is black, and straddles the band boundary 186 (see 192). Question marks are placed on the black blocks at the bottom of the band.

After color and question marks have been propagated, there will be question marks for all the black blocks that contain the border around the bar chart. Because this band has question marks in it, this band (its CMYK data) is spooled to disk. The question mark blocks are spooled as black blocks, i.e. the data remains in the K plane. Again, the algorithm is guessing true black is the correct ink to use. All question marks are then removed from the black and color tables. Those question mark blocks are now black blocks.

Band 4 is brought into memory. The black circle 196 that straddles Bands 4 and 5 at 188 causes question marks in two blocks, similar to the border in Band 3. After color and question marks have been propagated, color will have propagated back into band three (the color from the bars propagates to the border in Band 4, and continues up the border into band three). The data spooled to disk for Band 3 is incorrect, it assumed the border would be printed with true black, not composite black.

This method now backs up to Band 3 and receives the CMYK planes again. The method keeps track of which bands have been spooled to disk. When the CMYK data for Band 3 is received this second time, the color and black tables for this band are complete, and the method knows which inks should be used for the border around the color chart. The color table will show those blocks for border already marked as color, and will move the K data to the CMY planes so it will be printed as composite black.

Band 4 is now re-processed, and will be spooled to disk because of the black circle 196 that straddles band boundary 188. The question marks in Band 4 are removed and Band 5 is brought into memory. After marking the black and color blocks in Band 5, there are no black blocks on the bottom row of the band. In fact, the last band of the page is a special case—there can be no question marks in this band, since black at the bottom of the last band will not touch color. Color is now propagated (there are no question marks to propagate). After color propagation is complete, there will be no question marks in band four, since none propagated up from Band 5. The data spooled to disk for Band 4 is sent directly to the printer. Band 5 has no question marks in it, so it is sent directly to the printer.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. In a liquid ink color graphics printing system, a method of controlling bleed between colors dots and true black dots in a printed image, comprising:

selecting a minimum spacing between color dots and true black dots adequate to control bleed therebetween in a printed image;

receiving bit-map color graphics input data defining an image to be printed, the input data including a series of pixels, each data pixel corresponding to a respective pixel of the image;

examining the input data to detect black pixels located within the minimum spacing of color pixels in violation of the minimum spacing requirement;

designating said detected black pixels for printing as composite black dots; and designating all other black pixels for printing as true black dots, thereby maximizing use of true black ink while preventing bleed between true black dots and color dots.

2. A method according to claim 1 wherein examining the input data includes:

providing a storage means for spooling a print data stream;

dividing a page of the graphics input data to form a series of bands, each band of input data comprising a predetermined number of rows of pixels;

loading a first band of the series into a local memory space as a current band;

in the current band, examining the input data to detect a black pixel adjacent the bottom of the band;

if the current band does not indicate a black pixel located adjacent the bottom of the first band, forwarding the first band as a print data stream for printing; and;

if the current band indicates a black pixel adjacent the bottom of the band, spooling the first band to the storage means as a print data stream for deferred printing after possible adjacency violations propagating from subsequent bands in the series are resolved.

3. A method according to claim 2 wherein examining the input data includes:

selecting a block size corresponding to the minimum spacing between color and black inks in both vertical and horizontal dimensions;

logically partitioning the first band to define a series of blocks of the selected block size;

designating each one of the blocks in the first band as one of color, black, white or questionmark, thereby compressing the data for color separation; and storing the block designations in a color table and a black table, each of the said tables having a single bit location corresponding to each block of data.

4. A method according to claim 3 further comprising:

loading another band of data as a current band;

repeating said partitioning designating steps with respect to the current band;

updating the tables to include said designations of the blocks in the current band as well as all previously loaded bands;

examining all the block designations in the tables to detect black blocks adjacent color blocks;

re-designating detected black blocks as color blocks, thereby propagating color data through black data in the tables;

examining all the block designations in the tables to detect black blocks adjacent questionmark blocks; and re-designating detected black blocks as questionmark blocks, thereby propagating questionmark data through black data in the tables.

5. A method according to claim 4 further comprising:

repeating said examining and re-designating steps until no black blocks are detected adjacent color blocks or adjacent questionmark blocks, thereby ensuring at least the minimum spacing between color data and black data.

6. A method according to claim 3 wherein the step of designating the blocks includes:

building a color table in the local memory space having a series of bits, each color table bit corresponding to a respective one of the color plane blocks and indicating by its state whether or not the corresponding color plane block is a color block;

building a black table having a series of bits, each black table bit corresponding to a respective one of the K plane blocks and indicating by its state whether or not the corresponding K plane block is a black block; and indicating a questionmark block in the tables by indicating in the corresponding table bits that the block is both a color block and a black block.

7. A method according to claim 2 further comprising:

loading a second band of the image data;

in the second band of image data, separating composite black data from color data for printing the composite black data using true black ink;

examining the separated data to detect adjacency violations comprising true black pixels located within the minimum spacing of color pixels;

correcting detected adjacency violations by changing the detected black pixels from true black pixels to composite black pixels;

inspecting a predetermined number of rows adjacent the top of the second band to detect data that indicates black ink;

if no such indication of black ink is found adjacent the top of the second band, printing the spooled first band of image data;

modifying the first band of data if necessary to enforce the minimum spacing requirement with respect to black dots in the second band and then printing the first band of image data.

8. A method according to claim 1 wherein examining the input data includes:

dividing a page of the graphics input data to form a series of bands, each band of input data comprising a predetermined number of rows of bits;

loading a first band of the series into a local memory space as a current band;

separating the data to form color planes and an initial K-plane of true black data;

forming a color table to represent the color planes in compressed form, the color table having sufficient resolution to detect minimum spacing violations;

forming a black table to represent the K-plane data in compressed form, the black table having the same resolution as the color table for detecting minimum spacing violations;

loading a subsequent band of the series into a local memory space as a current band; and updating the color and black tables so as to include the current band of data so that the color table and the black table include bits corresponding to all bands received for the current page.

9. A method according to claim 8 further comprising:

if the current band is not the last band of the current page, converting black blocks along the bottom of the band to questionmark blocks;

examining the tables to detect black blocks adjacent color blocks;

throughout the tables, re-designating detected black blocks as color blocks, thereby propagating color data through black data in the tables;

within the current band, moving detected black blocks of data adjacent color blocks back into the color planes for printing as composite black;

repeating said examining, re-designating and moving steps until no black blocks are detected adjacent color blocks in the tables;

examining the tables to detect black blocks adjacent questionmark blocks; and throughout the tables, re-designating detected black blocks as questionmark blocks, thereby propagating questionmark data through black data in the tables.

10. A method of compressing bit-map color graphics data for high-speed color separation comprising the steps of:

if the color graphics data includes composite black data, forming a K plane having the same dimensions as the color planes for storing true black data, each bit location in the K plane corresponding to a respective bit location in the color planes, and moving composite black data out of the color planes and into the K plane for possible printing using black ink;

defining an array of blocks of color data, each block corresponding to a predetermined rectangular array of bit locations in all the color planes;

for each block of color data, examining the corresponding bit locations in all the color planes to detect an indication of a color dot in any of said planes;

if a color dot is detected within the block, designating the block as a color block;

for each block of color data, defining a corresponding K-plane block of black data, each K-plane block data thus corresponding to a predetermined rectangular array of bit locations in the K plane;

for each K-plane block, examining the corresponding bit locations in the K plane to detect an indication of a black dot;

if a black dot is detected within the block, designating the K-plane block as a black block; and defining as a white block each block of image data that is not designated as a color block or a black block.

11. A method according to claim 10 further comprising:

building a color table having a series of bits, each color table bit corresponding to a respective one of the color plane blocks and indicating by its state whether or not the corresponding color plane block is a color block; and building a black table having a series of bits, each black table bit corresponding to a respective one of the K-plane blocks and indicating by its state whether or not the corresponding K-plane block is a black block;

whereby, for each white block, the corresponding bit in the color table indicates no color dots and the corresponding bit in the black table indicates no black dots, thereby allowing high-speed indirect examination of the graphics data for color separation by examination instead of the color table and the black table.

12. In a liquid ink color graphics printing system, a method of controlling bleed between colors dots and true black dots in a printed image, comprising:

selecting a minimum spacing requirement between color dots and true black dots adequate to control bleed therebetween in a printed image;

dividing a page of the graphics input data to form a series of bands, each band of input data comprising a predetermined number of rows of bits;

loading a first band of the series into a local memory space as a current band;

examining the current band to identify all black data;

attempting to determine a correct ink for printing the identified black data so as to maintain the minimum spacing between true black dots and color dots;

if the correct ink can be determined, printing the band;

if the correct ink cannot be determined, processing the band designating all black objects for printing with true black ink and spooling the output data to disk;

sequentially examining a number of subsequent bands sufficient to determine whether the spooled data is correct;

if the spooled output data is correct, forwarding the data to the printer; and if the spooled output data is incorrect, re-imaging the corresponding band of input data.

* * * * *